United States Patent
Chen et al.

(10) Patent No.: US 10,440,771 B2
(45) Date of Patent: Oct. 8, 2019

(54) CONDITIONAL HARQ FEEDBACK

(71) Applicant: QUALCOMM Incorporated, San Diego, CA (US)

(72) Inventors: Wanshi Chen, San Diego, CA (US); Durga Prasad Malladi, San Diego, CA (US); Aleksandar Damnjanovic, Del Mar, CA (US); Shimman Arvind Patel, San Diego, CA (US); Madhavan Srinivasan Vajapeyam, San Diego, CA (US); Michael Mao Wang, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 15/059,153

(22) Filed: Mar. 2, 2016

(65) Prior Publication Data

US 2016/0261391 A1    Sep. 8, 2016

Related U.S. Application Data

(60) Provisional application No. 62/129,491, filed on Mar. 6, 2015.

(51) Int. Cl.
*H04L 5/00*     (2006.01)
*H04W 76/27*    (2018.01)
(Continued)

(52) U.S. Cl.
CPC ........... *H04W 76/27* (2018.02); *H04L 1/1812* (2013.01); *H04L 1/1825* (2013.01);
(Continued)

(58) Field of Classification Search
CPC .................................. H04W 72/00; H04L 5/00
See application file for complete search history.

(56) References Cited

U.S. PATENT DOCUMENTS

2005/0025254 A1*   2/2005   Awad ................... H04L 1/0003
                                                                  375/295
2009/0307554 A1   12/2009   Marinier et al.
(Continued)

FOREIGN PATENT DOCUMENTS

EP        2938019 A1      10/2015
WO     WO-2014110790 A1    7/2014

OTHER PUBLICATIONS

Hewlett Packard, "Latency Evaluation for HSDPA/EDCH," 3GPP TSG RAN WG2 Meeting #56, R2-063126, Riga, Latvia, Nov. 6-10, 2006, 8 pgs., XP050602815, 3rd Generation Partnership Project.
(Continued)

*Primary Examiner* — Sulaiman Nooristany
(74) *Attorney, Agent, or Firm* — Holland & Hart LLP

(57) ABSTRACT

Methods for managing hybrid automatic repeat request (HARQ) feedback are disclosed, where HARQ feedback operations by a receiving device may be modified. A receiving device may receive a data transmission. The receiving device may evaluate a condition for determining how to provide HARQ feedback in response to the data transmission. The receiving device may modify a HARQ feedback operation based at least in part on the condition. Modification of HARQ feedback operations may include turning off HARQ feedback, excluding negative acknowledgment (NAK) reporting, or excluding acknowledgement (ACK) reporting.

28 Claims, 19 Drawing Sheets

(51) Int. Cl.
 *H04L 1/18* (2006.01)
 *H04L 5/14* (2006.01)
(52) U.S. Cl.
 CPC .......... *H04L 1/1861* (2013.01); *H04L 1/1864*
 (2013.01); *H04L 5/001* (2013.01); *H04L 5/005*
 (2013.01); *H04L 5/0023* (2013.01); *H04L 5/0055* (2013.01); *H04L 5/14* (2013.01)

(56) References Cited

U.S. PATENT DOCUMENTS

| | | |
|---|---|---|
| 2010/0281322 A1 | 11/2010 | Park et al. |
| 2012/0039301 A1 | 2/2012 | Kim et al. |
| 2016/0249329 A1* | 8/2016 | Au .................. H04W 48/00 |
| 2016/0261391 A1* | 9/2016 | Chen ................ H04L 5/0048 |
| 2017/0214494 A1* | 7/2017 | Qiang .............. H04L 1/1819 |
| 2017/0317791 A1* | 11/2017 | Wiberg ............. H04L 1/1825 |

OTHER PUBLICATIONS

ISA/EP, International Search Report and Written Opinion of the International Searching Authority, Int'l Application No. PCT/US2016/020582, dated Oct. 10, 2016, European Patent Office, Rijswijk, NL, 21 pgs.

QUALCOMM, "Comparison of TDM and CDM ACKCH Performance", 3GPP TSG-RAN WG1 Meeting #34, Tdoc R1-03-1011, Seoul, Korea, Oct. 6-10, 2003, 7 pgs., 3rd Generation Partnership Project.

Samsung, "HARQ Operation at TTI Reconfiguration," 3GPP TSG-RAN2 Meeting #46, R2-050350, Scottsdale, Arizona, Feb. 14-18, 2005, 4 pgs., XP050127612, 3rd Generation Partnership Project.

ISA/EP, Partial International Search Report of the International Searching Authority, Int'l. App. No. PCT/US2016/020582, dated Jul. 18, 2016, European Patent Office, Rijswijk, NL, 7 pgs.

* cited by examiner

CONDITIONAL HARQ FEEDBACK

CROSS REFERENCES

The present Application for Patent claims priority to U.S. Provisional Patent Application No. 62/129,491 by Chen et al., entitled "Simplified HARQ Management," filed Mar. 6, 2015, assigned to the assignee hereof.

BACKGROUND

Field of the Disclosure

The present disclosure, for example, relates to wireless communication systems, and more particularly to management of hybrid automatic repeat request (HARQ) feedback operations.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems (e.g., a Long Term Evolution (LTE) system).

By way of example, a wireless multiple-access communication system may include a number of base stations, each simultaneously supporting communication for multiple communication devices, otherwise known as user equipments (UEs). A base station may communicate with UEs on downlink (DL) channels (e.g., for transmissions from a base station to a UE) and uplink (UL) channels (e.g., for transmissions from a UE to a base station).

Communications between base stations and UEs may include the use of various feedback signaling. One form of feedback is HARQ feedback. HARQ feedback may be provided by a receiving device to a sending device, and may include the transmission of various reporting signals to the sending device. Example reporting signals may include acknowledgement (ACK) signals representing an ACK state, and negative acknowledgement (NAK) signals representing a NAK state. A UE may also be in a discontinuous transmission (DTX) state. An ACK signal may be transmitted as part of HARQ feedback in response to successful reception and decoding of a data transmission. A NAK signal may be transmitted as part of HARQ feedback in response to a reception of a data transmission but an unsuccessful decoding of the data transmission. The UE may enter a DTX state when the UE fails to receive a data transmission.

In certain circumstances, however, such as when the communication time slots on which HARQ feedback is to be reported have been reduced in time to a duration of a single symbol (as may be the case in ultra low latency (ULL) environments), timely reporting of HARQ feedback may be a challenge.

SUMMARY

In situations where provision of timely hybrid automatic repeat request (HARQ) feedback is a challenge due to, for example, the use of communication time slots that may be as short as a single symbol duration, HARQ feedback operations may be modified. In some circumstances, a receiving device may determine to turn off HARQ feedback. In other circumstances, a receiving device may determine to simplify HARQ feedback operations. For example, a receiving device may determine to exclude negative acknowledgement (NAK) reporting from HARQ feedback. In another example, a receiving device may determine to exclude acknowledgement (ACK) reporting from HARQ feedback. The determination by the receiving device may be made based on conditions evaluated by the receiving device. The evaluated conditions may include signaling received from a sending device or may include channel or traffic conditions. The decision to modify a HARQ feedback operation may also influence channel quality indicator (CQI) reporting by a receiving device and the use of a modulation and coding scheme (MCS) by a sending device.

In a first set of illustrative examples, a method for wireless communication at a receiving device is described. The method may include receiving a data transmission and evaluating a condition for determining information to include as HARQ feedback in response to the data transmission. The method may also include modifying a HARQ feedback operation based at least in part on the condition.

In some embodiments of the method, the method may further include receiving a device configuration indicating that HARQ feedback is to be turned off, wherein the device configuration is the condition to be evaluated. Alternatively, the method may include receiving an indication in a control channel that HARQ feedback for the data transmission is to be turned off, wherein the indication is the condition to be evaluated. Evaluating the condition for determining information to include as HARQ feedback may include determining that the receiving device is power-limited and that, based at least in part on the determining, HARQ feedback is to be turned off. Evaluating the condition for determining information to include as HARQ feedback may also include receiving an MCS index, and determining that the MCS index is below an MCS index threshold and that, based at least in part on the determining, HARQ feedback is to be turned off. The MCS index threshold may be predetermined or may be received via radio resource control (RRC) signaling.

In some embodiments, modifying the HARQ feedback operation based at least in part on the condition may include modifying the HARQ feedback operation to exclude NAK reporting. NAK reporting may be excluded based at least in part on an indication received in a control channel. NAK reporting may also be excluded based at least in part on a determination that a received power of a reference signal at the receiving device is below a predetermined threshold.

In some embodiments, modifying the HARQ feedback operation based at least in part on the condition may include modifying the HARQ feedback operation to exclude ACK reporting. Excluding ACK reporting may be based at least in part on an indication received in a control channel. Excluding ACK reporting may be based at least in part on a determination that the receiving device is power-limited. Excluding ACK reporting may be based at least in part on a determination that a received power of a reference signal at the receiving device is above a predetermined threshold.

In some aspects, evaluating the condition for determining information to include as HARQ feedback may include determining channel or traffic conditions. In other aspects, modifying the HARQ feedback operation based at least in part on the condition may include using a transmission time interval (TTI) for HARQ feedback that is longer than a TTI used for the data transmission. In some aspects, the method may further include transmitting to a sending device that sent the data transmission an indication that the HARQ feedback operation has been modified. The indication may be transmitted periodically or in response to an aperiodic request. The indication may be transmitted as part of a physical layer payload or as part of a media access control (MAC) layer payload.

In a second set of illustrative examples, an apparatus for wireless communication at a receiving device is described. The apparatus may include means for receiving a data transmission and means for evaluating a condition for determining information to include as HARQ feedback in response to the data transmission. The apparatus may further include means for modifying a HARQ feedback operation based at least in part on the condition. In some examples, the apparatus may further include means for implementing one or more aspects of the method for wireless communication described above with respect to the first set of illustrative examples.

In a third set of illustrative examples, another apparatus for wireless communication at a receiving device is described. The apparatus may include a processor, memory in electronic communication with the processor, and instructions stored in the memory. The instructions may be executable by the processor to receive a data transmission, and to evaluate a condition for determining information to include as HARQ feedback in response to the data transmission. The instructions may further be executable by the processor to modify a HARQ feedback operation based at least in part on the condition. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication at a receiving device is described. The code may be executable by a processor to receive a data transmission and to evaluate a condition for determining information to include as HARQ feedback in response to the data transmission. The code may also be executable by the processor to modify a HARQ feedback operation based at least in part on the condition. In some examples, the code may also be used to implement one or more aspects of the method for wireless communication described above with respect to the first set of illustrative examples.

In a fifth set of illustrative examples, a method for wireless communication at a sending device is described. The method may include sending an indication that a HARQ feedback operation is to be modified, and receiving HARQ feedback or an absence of HARQ feedback in accordance with the indication.

In certain aspects of the method, sending the indication that the HARQ feedback operation is to be modified may include sending a device configuration indicating that HARQ feedback is to be turned off. Sending the indication that the HARQ feedback operation is to be modified may also include sending the indication in a control channel that HARQ feedback is to be turned off. Sending the indication that the HARQ feedback operation is to be modified may further include sending a MCS index threshold to indicate to a receiving device that the receiving device is to turn off HARQ feedback for data transmissions having an MCS index below the MCS index threshold. The MCS index threshold may be sent via RRC signaling.

In some aspects, sending the indication that the HARQ feedback operation is to be modified may include sending the indication that the HARQ feedback operation is to be modified by excluding NAK reporting. Alternatively, sending the indication that the HARQ feedback operation is to be modified may include sending the indication that the HARQ feedback operation is to be modified by excluding ACK reporting. The indication may be sent in a control channel.

In some embodiments, the method may further include estimating channel conditions using a sounding reference signal (SRS) transmission, and determining whether to expect modified HARQ reporting based at least on the estimating of channel conditions. In other embodiments, receiving HARQ feedback or an absence of HARQ feedback in accordance with the indication may include receiving HARQ feedback on a TTI that is longer than a TTI used for a data transmission to which the HARQ feedback is responsive.

In some aspects, the method may further include receiving a HARQ feedback operation modification indication from a device providing the HARQ feedback, the HARQ feedback operation modification indication indicating that the HARQ feedback operation has been modified. Receiving the HARQ feedback operation modification indication may include receiving the HARQ feedback operation modification indication periodically or in response to an aperiodic request. Receiving the HARQ feedback operation modification indication may include receiving the HARQ feedback operation modification indication as part of a physical layer payload or as part of a MAC layer payload.

In a sixth set of illustrative examples, an apparatus for wireless communication at a sending device is described. The apparatus may include means for sending an indication that a HARQ feedback operation is to be modified, and means for receiving HARQ feedback or an absence of HARQ feedback in accordance with the indication. In some examples, the apparatus may further include means for implementing one or more aspects of the method for wireless communication described above with respect to the fifth set of illustrative examples.

In a seventh set of illustrative examples, another apparatus for wireless communication at a sending device is described. The apparatus may include a processor, memory in electronic communication with the processor, and instructions stored in the memory. The instructions may be executable by the processor to send an indication that a HARQ feedback operation is to be modified, and to receive HARQ feedback or an absence of HARQ feedback in accordance with the indication. In some examples, the instructions may also be executable by the processor to implement one or more aspects of the method for wireless communication described above with respect to the fifth set of illustrative examples.

In an eighth set of illustrative examples, a non-transitory computer-readable medium storing computer-executable code for wireless communication at a sending device is described. The code may be executable by a processor to send an indication that a HARQ feedback operation is to be modified, and to receive HARQ feedback or an absence of HARQ feedback in accordance with the indication. In some examples, the code may also be used to implement one or more aspects of the method for wireless communication described above with respect to the fifth set of illustrative examples.

In a ninth set of illustrative examples, a method for wireless communication at a receiving device is described. The method may include determining a CQI index from a plurality of CQI indices to report to a sending device, at least some of the plurality of CQI indices being associated with different target block error rates (BLERs). The method may also include reporting the CQI index.

In some embodiments of the method, the method may further include associating different BLERs with the at least some of the plurality of CQI indices based at least in part on a determination of whether to provide HARQ feedback in response to a data transmission for which the CQI index relates. Determining the CQI index may include associating two different BLERs with the plurality of CQI indices, wherein a lower BLER is associated with the at least some of the plurality of CQI indices, and determining the CQI index from the at least some of the plurality of CQI indices based at least in part on a determination to not provide HARQ feedback in response to a data transmission for which the CQI index relates. The method may also include determining to not provide HARQ feedback based at least in part on channel conditions.

In a tenth set of illustrative examples, an apparatus for wireless communication at a receiving device is described. The apparatus may include means for determining a CQI index from a plurality of CQI indices to report to a sending device, at least some of the plurality of CQI indices being associated with different target BLERs. The apparatus may also include means for reporting the CQI index. In some examples, the apparatus may further include means for implementing one or more aspects of the method for wireless communication described above with respect to the ninth set of illustrative examples. For instance, the apparatus may include means for associating different BLERs with the at least some of the plurality of CQI indices based at least in part on a determination of whether to provide HARQ feedback in response to a data transmission for which the CQI index relates.

In some cases, the apparatus may include means for associating two different BLERs with the plurality of CQI indices, wherein a lower BLER is associated with the at least some of the plurality of CQI indices. The apparatus may also include means for determining the CQI index from the at least some of the plurality of CQI indices based at least in part on a determination to not provide HARQ feedback in response to a data transmission for which the CQI index relates. In some examples, the apparatus may include determining to not provide HARQ feedback based at least in part on channel conditions.

In an eleventh set of illustrative examples, another apparatus for wireless communication at a receiving device is described. The apparatus may include a processor, memory in electronic communication with the processor, and instructions stored in the memory. The instructions may be executable by the processor to determine a CQI index from a plurality of CQI indices to report to a sending device, at least some of the plurality of CQI indices being associated with different target BLERs. The instructions may also be executable by the processor to report the CQI index. In some examples, the instructions may also be executable by the processor to implement one or more aspects of the method for wireless communication described above with respect to the ninth set of illustrative examples. For instance, the instructions may be executable to associate different BLERs with the at least some of the plurality of CQI indices based at least in part on a determination of whether to provide HARQ feedback in response to a data transmission for which the CQI index relates.

In some cases, the instructions may be executable by the processor to associate two different BLERs with the plurality of CQI indices, wherein a lower BLER is associated with the at least some of the plurality of CQI indices. The instructions may also be executable by the processor to determine the CQI index from the at least some of the plurality of CQI indices based at least in part on a determination to not provide HARQ feedback in response to a data transmission for which the CQI index relates. In some examples, the instructions may be executable by the processor to determine to not provide HARQ feedback based at least in part on channel conditions.

In a twelfth set of illustrative examples, a non-transitory computer-readable medium storing computer-executable code for wireless communication at a receiving device is described. The code may be executable by a processor to determine a CQI index from a plurality of CQI indices to report to a sending device, at least some of the plurality of CQI indices being associated with different target BLERs. The code may also be executable by the processor to report the CQI index. In some examples, the code may also be used to implement one or more aspects of the method for wireless communication described above with respect to the ninth set of illustrative examples. For instance, the code may be executable by the processor to associate different BLERs with the at least some of the plurality of CQI indices based at least in part on a determination of whether to provide HARQ feedback in response to a data transmission for which the CQI index relates.

In some cases, the code may be executable by the processor to associate two different BLERs with the plurality of CQI indices, wherein a lower BLER is associated with the at least some of the plurality of CQI indices. The code may also be executable by the processor to determine the CQI index from the at least some of the plurality of CQI indices based at least in part on a determination to not provide HARQ feedback in response to a data transmission for which the CQI index relates. In some examples, the code may be executable by the processor to determine to not provide HARQ feedback based at least in part on channel conditions.

In a thirteenth set of illustrative examples, a method for wireless communication at a sending device is described. The method may include determining an MCS index from a plurality of MCS indices for use in data transmission to a receiving device, at least some of the plurality of MCS indices being associated with different target BLERs. The method may also include sending a data transmission to the receiving device using the MCS index.

In some embodiments of the method, the method may further include associating different BLERs with the at least some of the plurality of MCS indices based at least in part on whether the receiving device is reporting HARQ feedback. Determining the MCS index may include associating two different BLERs with the plurality of MCS indices, wherein a lower BLER is associated with the at least some of the plurality of MCS indices, and determining the MCS index from the at least some of the plurality of MCS indices based at least in part on a determination that the receiving device is not providing HARQ feedback. The method may further include determining that the receiving device is not providing HARQ feedback based at least in part on channel conditions.

In a fourteenth set of illustrative examples, an apparatus for wireless communication at a sending device is described. The apparatus may include means for determining an MCS index from a plurality of MCS indices for use in data transmission to a receiving device, at least some of the plurality of MCS indices being associated with different target BLERs. The apparatus may further include means for sending a data transmission to the receiving device using the MCS index. In some examples, the apparatus may further include means for implementing one or more aspects of the method for wireless communication described above with respect to the thirteenth set of illustrative examples. For instance, the apparatus may include means for associating different BLERs with the at least some of the plurality of MCS indices based at least in part on whether the receiving device is reporting HARQ feedback.

In some cases, the apparatus may include means for associating two different BLERs with the plurality of MCS indices, wherein a lower BLER is associated with the at least some of the plurality of MCS indices. The apparatus may also include means for determining the MCS index from the at least some of the plurality of MCS indices based at least in part on a determination that the receiving device is not providing HARQ feedback. In some examples, the apparatus may include means for determining that the receiving device is not providing HARQ feedback based at least in part on channel conditions.

In a fifteenth set of illustrative examples, another apparatus for wireless communication at a sending device is described. The apparatus may include a processor, memory in electronic communication with the processor, and instructions stored in the memory. The instructions may be executable by the processor to determine an MCS index from a plurality of MCS indices for use in data transmission to a receiving device, at least some of the plurality of MCS indices being associated with different target BLERs. The instructions may also be executable by the processor to send a data transmission to the receiving device using the MCS index. In some examples, the instructions may also be executable by the processor to implement one or more aspects of the method for wireless communication described above with respect to the thirteenth set of illustrative examples. For instance, the instructions may be executable by the processor to associate different BLERs with the at least some of the plurality of MCS indices based at least in part on whether the receiving device is reporting HARQ feedback.

In some cases, the instructions may be executable by the processor to associate two different BLERs with the plurality of MCS indices, wherein a lower BLER is associated with the at least some of the plurality of MCS indices. The instructions may also be executable by the processor to determine the MCS index from the at least some of the plurality of MCS indices based at least in part on a determination that the receiving device is not providing HARQ feedback. In some examples, the instructions are executable by the processor to determine that the receiving device is not providing HARQ feedback based at least in part on channel conditions.

In a sixteenth set of illustrative examples, a non-transitory computer-readable medium storing computer-executable code for wireless communication at a sending device is described. The code may be executable by a processor to determine an MCS index from a plurality of MCS indices for use in data transmission to a receiving device, at least some of the plurality of MCS indices being associated with different target BLERs. The code may also be executable by the processor to send a data transmission to the receiving device using the MCS index. In some examples, the code may also be used to implement one or more aspects of the method for wireless communication described above with respect to the thirteenth set of illustrative examples. For instance, the code may be executable by the processor to associate different BLERs with the at least some of the plurality of MCS indices based at least in part on whether the receiving device is reporting HARQ feedback.

In some cases, the code may be executable by the processor to associate two different BLERs with the plurality of MCS indices, wherein a lower BLER is associated with the at least some of the plurality of MCS indices. The code may also be executable by the processor to determine the MCS index from the at least some of the plurality of MCS indices based at least in part on a determination that the receiving device is not providing HARQ feedback. In some examples, the code may be executable by the processor to determine that the receiving device is not providing HARQ feedback based at least in part on channel conditions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
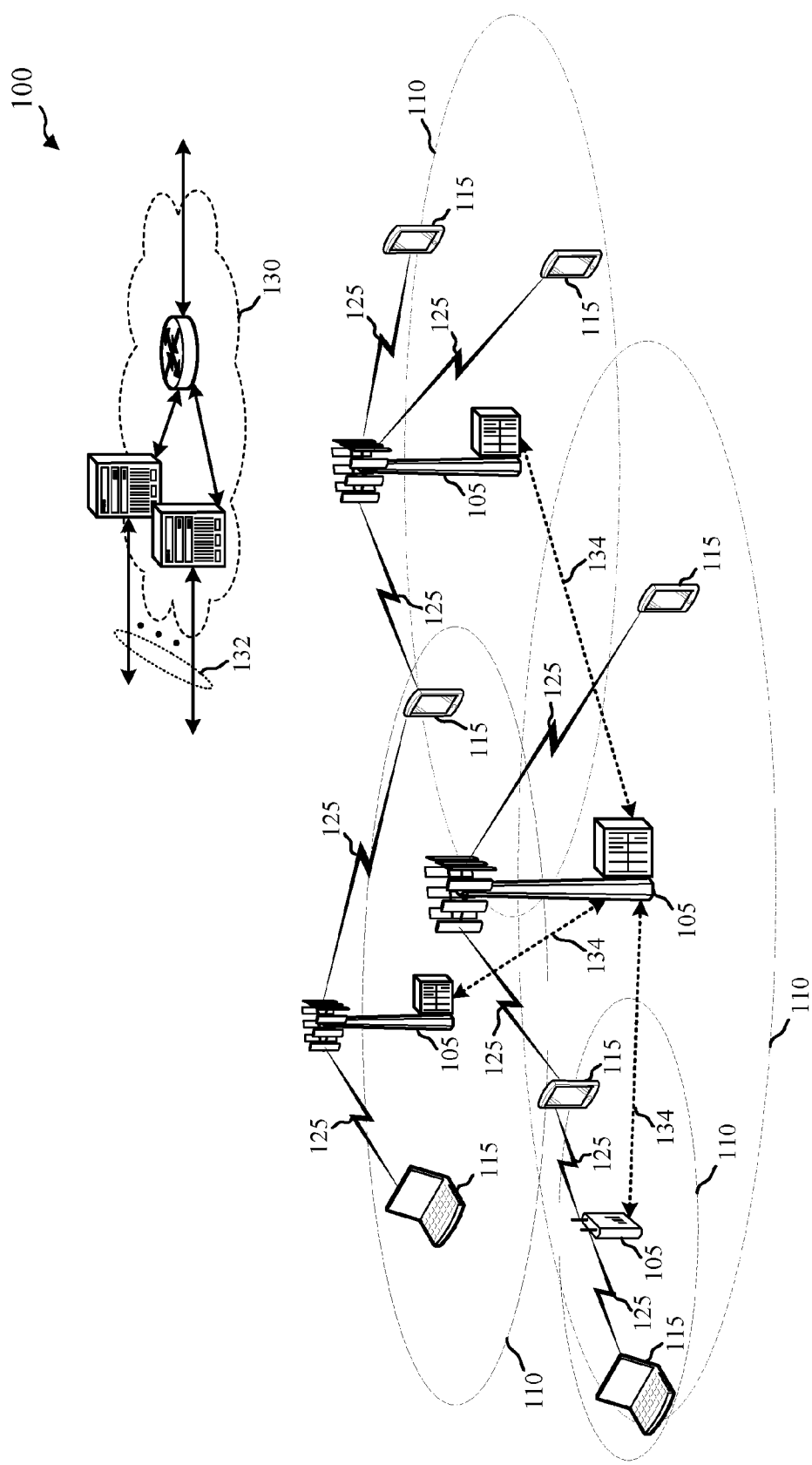
FIG. 1 illustrates an example of a wireless communications system that supports modified hybrid automatic repeat request (HARQ) feedback operations, in accordance with various aspects of the present disclosure.

In certain communication systems, there is an ongoing effort to reduce latency. For example, in Long-Term Evolution (LTE) systems, there is an ongoing effort to reduce over-the-air latency by as much as ten times. This degree of latency reduction in an LTE system may be referred to as an ultra low latency (ULL) system. A ULL system may include communications that are limited in time to a duration of single symbol, for example. As a result, some types of communications, including feedback signaling such as hybrid automatic repeat request (HARQ) feedback, may be constrained to be made within a very short period of time. Whereas in conventional LTE systems, HARQ feedback may be communicated with up to 4 ms latency, in ULL systems, HARQ feedback may be limited to a 300 μs latency. As a result of the difficulties of providing HARQ feedback having such low latencies, HARQ feedback operations may be modified.

HARQ feedback typically includes the transmission of various reporting signals from a receiving device to a sending device. Example reporting signals may include acknowledgement (ACK) signals when a data transmission is successfully received and decoded, and negative acknowledgement (NAK) signals when a data transmission is received but not successfully decoded. HARQ feedback may also indicate that a receiving device is in a discontinuous transmission (DTX) state. A DTX state may indicate that the receiving device has not received a data transmission.

In a modified HARQ feedback operation, however, a receiving device may determine to turn off HARQ feedback. In other circumstances, a receiving device may determine to simplify HARQ feedback operations. For example, a receiving device may determine to exclude either NAK reporting or ACK reporting from HARQ feedback. The determination of how to simplify the HARQ feedback operations may be made by the receiving device based on conditions evaluated by the receiving device. The evaluated conditions may include signaling received from a sending device or may include channel or traffic conditions.

Because modification of a HARQ feedback operation may result in a decision to not transmit HARQ feedback or to not transmit specific feedback signals, other transmissions may be modified in order to compensate for the absence of specific HARQ transmissions. For example, a receiving device may select and report a channel quality indicator (CQI) index from among a set of CQI indices. At least some of the set of CQI indices may correspond to different target block error rates (BLERs) that may be associated with whether a HARQ feedback operation has been modified. Similarly, a sending device may use different modulation and coding schemes (MCSs) for data transmissions where HARQ feedback has been modified. An MCS may be selected based on different target BLERs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 that supports modified HARQ feedback operations, in accordance with various aspects of the present disclosure. The wireless communications system 100 includes base stations 105, user equipments (UEs) 115, and a core network 130. In some examples, the wireless communications system 100 may be an LTE/LTE-Advanced (LTE-A) network. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term eNB may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may, in some examples, be a ULL system. In a ULL system, over-the-air latency may be reduced by as much as ten times in relation to a conventional LTE system. A ULL system may include communications that are limited in time to a duration of single symbol, for example. Thus, whereas in conventional LTE systems, HARQ feedback may be communicated with up to 4 ms latency, in ULL systems, HARQ feedback may be limited to a 300 μs latency. Despite this, ULL systems are still designed to include minimal specification and implementation impact on conventional LTE systems, thus allowing for backward compatibility. For example, LTE numerology may be reused in ULL systems. A ULL system may utilize 15 kHz tone spacing and may also utilize a symbol duration of about 71 μs, a duration of a normal cyclic prefix (CP) in LTE. A symbol duration of 83 μs may also be used, being the duration of an extended CP in LTE. Additionally, ULL systems may be designed to maintain integration of legacy UEs and ULL UEs (having subframes equal to 1 ms, for example). Coexistence between legacy UEs and ULL UEs in a same subframe may be accomplished via resource block (RB)-level multiplexing.

Nevertheless, decreases in latency in a system may result in some corresponding decreases in efficiency. By decreasing latency, signaling that is used to improve efficiency may be adversely affected. For example, in a ULL system, a transmission time interval (TTI) is reduced. HARQ feedback within the reduced TTI length may be challenging, especially for UEs under unfavorable channel or traffic conditions. For example, the number of bits used for HARQ feedback may vary based on a number of CCs configured for a specific UE 115 and on a DL transmission mode configured for each CC. Therefore, when the number of CCs is high for a specific UE 115, HARQ feedback from that UE 115 may require more bits, which may be challenging to fit into a reduced-length TTI.

HARQ feedback typically includes the transmission of various reporting signals from a receiving device, such as a UE 115, to a sending device, such as a base station 105. Example reporting signals may include ACK signals and NAK signals. The failure to transmit either an ACK signal or a NAK signal may indicate that the UE 115 is in a DTX state. Therefore, in one example, a base station 105 may transmit a data transmission to a UE 115 via communication link 125. In response, the UE 115 may provide HARQ feedback to the base station 105. The HARQ feedback may be based on the received data transmission. For example, the UE 115 may transmit an ACK signal as part of HARQ feedback in response to successful reception and decoding of the data transmission. As another example, the UE 115 may transmit a NAK signal as part of HARQ feedback in response to an unsuccessful reception and decoding of the data transmission. When the UE 115 fails to transmit either an ACK signal or a NAK signal as part of HARQ feedback, the UE 115 may indicate to base station 105 that the UE 115 is in a DTX mode. However, as explained in greater detail below, these HARQ feedback operations may be modified in order to compensate for a reduced-length TTI, for example.

Figure 2:
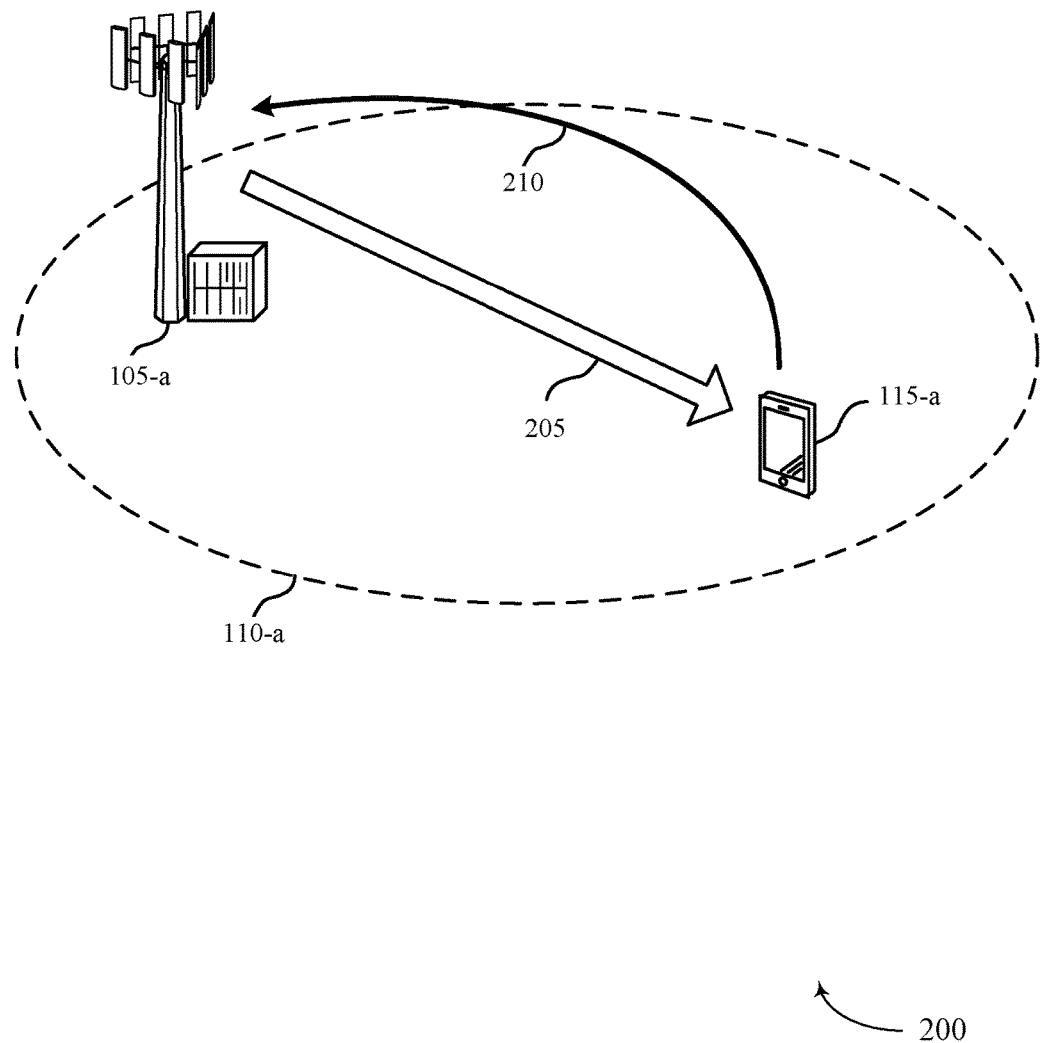
FIG. 2 illustrates an example of a wireless communications system that supports modified HARQ feedback operations, in accordance with various aspects of the present disclosure.

FIG. 2 illustrates an example of a wireless communications system 200 that supports modified HARQ feedback operations, in accordance with various aspects of the present disclosure. Wireless communications system 200 may include UE 115-*a* and base station 105-*a*, which may be examples of a UE 115 or a base station 105 described above with reference to FIG. 1. Base station 105-*a* and UE 115-*a* may communicate with one another via downlink 205 when UE 115-*a* is within coverage area 110-*a*, as generally described above with reference to FIG. 1. UE 115-*a* may indicate ACK/NAK/DTX states to base station 105-*a* via uplink 210 as generally described above with reference to FIG. 1.

For example, UE 115-*a* may receive a data transmission in the form of a set of transport blocks from base station 105-*a* via downlink 205. In some cases, the transport blocks may contain low-latency data (e.g., they may be sent using a reduced-length TTI). In some examples, the UE 115-*a* may provide HARQ feedback in response to the received data transmission. The HARQ feedback may be communicated to the base station 105-*a* via uplink 210. For example, in some cases, the UE 115-*a* may fail to decode a transport block and may send a NAK via uplink 210 to base station 105-*a*. In other cases, the UE 115-*a* may successfully decode a transport block and may send an ACK via uplink 210 to base station 105-*a*. However, because UE 115-*a* has received the data transmission as low latency data and may be part of a ULL system, the UE 115-*a* may be constrained to provide its HARQ feedback using similarly reduced-length TTIs. In order to do so, the UE 115-*a* may modify its HARQ feedback operations. In one example, the UE 115-*a* may elect to turn off HARQ feedback. In another example, the UE 115-*a* may elect to exclude either ACK or NAK reporting from its HARQ feedback. These decisions by the UE may be based on conditions evaluated by the UE 115-*a*, such as signals received via the downlink 205 from base station 105-*a*, or channel or traffic conditions. Meanwhile, the base station 105-*a* may determine that the UE 115-*a* is modifying its HARQ feedback operations. The base station 105-*a* may determine that the UE 115-*a* is modifying its HARQ feedback operations because the base station 105-*a* transmitted a HARQ feedback operation modification indicator to the UE 115-*a*. The base station 105-*a* may also determine that the UE 115-*a* is modifying its HARQ feedback operations by an evaluation of channel and traffic conditions. The UE 115-*a* may also indicate to the base station 105-*a* that HARQ feedback modification is occurring.

The UE 115-*a* may engage in HARQ feedback operation modification due to the number of HARQ bits being too great to reliably transmit on a reduced-length TTI. Additionally, if the UE 115-*a* is power limited, the UE 115-*a* may suspend or modify HARQ feedback operations in response to DL operations as HARQ feedback may not be very useful when the UE 115-*a* is power limited. A power limited device may limit its communications, and thus the feedback provided by HARQ feedback may not be useful for future communications or may be skipped altogether. Additionally, in some cases, HARQ feedback may not be necessary due to traffic needs. For example, if the base station 105-*a* has only a small number of bits to send to the UE 115-*a* (e.g., 40 bits) and very low latency is targeted, the base station 105-*a* may be motivated to complete the data transmission within as few data transport blocks as possible, without HARQ feedback.

The UE 115-*a* may also elect to use modified CQI indices in its CQI transmissions to the base station 105-*a* as a result of the HARQ feedback operation modifications. Conventionally, CQI indices are generally based on a same target BLER. However, if the UE 115-*a* is modifying its HARQ feedback operations such that HARQ feedback or aspects of HARQ feedback are not transmitted to the base station 105-*a*, the UE 115-*a* may elect to use a different target BLER for at least some of the CQI indices that may be sent to the base station 105-*a*. For example, for some CQI indices (e.g., CQI indices 1-5), the UE 115-*a* may assume a 10% initial BLER, while for other CGI indices (e.g., CQI indices 6-15), the UE 115-*a* may assume a 1% initial BLER. The UE 115-*a* may be more prone to report a CQI index having a lower initial BLER during times when HARQ feedback operations are suspended or otherwise modified. CQI reporting may be transmitted from the UE 115-*a* to the base station 105-*a* via the uplink 210.

Similarly, the base station 105-*a* may use different MCS indices in applying MCS to data transmissions to UEs 115-*a* that are modifying HARQ feedback operations. Like the CQI indices described above, the MCS indices may be based on different HARQ termination targets (e.g., BLERs). The base station 105-*a* may apply MCS to data transmissions communicated via the downlink 205.

Figure 3:
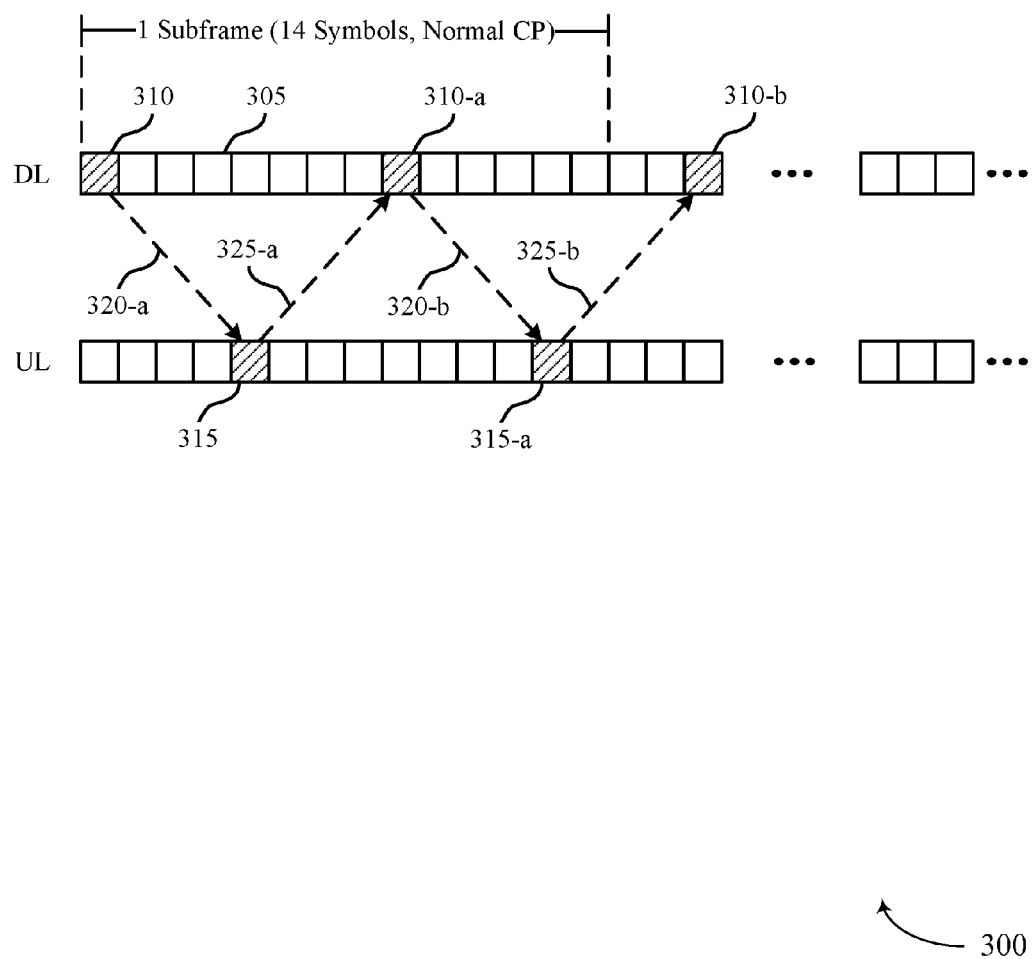
FIG. 3 illustrates an example of a channel structure that supports modified HARQ feedback operations, in accordance with various aspects of the present disclosure.

FIG. 3 illustrates an example of a channel structure 300 on which modified HARQ feedback may be provided, in accordance with various aspects of the present disclosure. Channel structure 300 may illustrate aspects of an ultra low latency transmission between a UE 115 and a base station 105, as described above with reference to FIGS. 1 and 2. Channel structure 300 illustrates a DL channel structure and an UL channel structure, each composed of ULL TTIs 305. The ULL TTIs 305 on the DL channel structure may include ultra low latency physical downlink control channels (uPDCCHs) or ultra low latency physical downlink shared channels (uPDSCHs). The ULL TTIs 305 on the UL channel structure may include ultra low latency physical uplink control channels (uPUCCHs) or ultra low latency physical uplink shared channels (uPUSCHs).

In the channel structure 300, each ULL TTI 305 may be one symbol in duration, or approximately 71 µs for a normal CP or 83 µs for an extended CP. In some examples, a subframe may be approximately 1 ms in length. Thus, a single subframe may include up to 14 symbols having normal CP, or 12 symbols having extended CP. Up to eight HARQ processes may occur (using FDD). In the illustrated example, a base station 105 transmits a data transport block on symbol 310 to a UE 115 via downlink 320-a. The UE 115 may receive the data transport block on symbol 315 and then transmit HARQ feedback in response. The HARQ feedback is transmitted via uplink 325-a. The base station 105 may receive the HARQ feedback on symbol 310-a and transmit additional data transport blocks to the UE 115 via downlink 320-b. The UE 115 may receive the additional data transport blocks on symbol 315-a and respond with additional HARQ feedback via uplink 325-b, which may be received by the base station 105 on symbol 310-b. The HARQ feedback transmitted on uplinks 325-a, 325-b may be modified. In some examples, the HARQ feedback is not transmitted at all.

Figure 4:
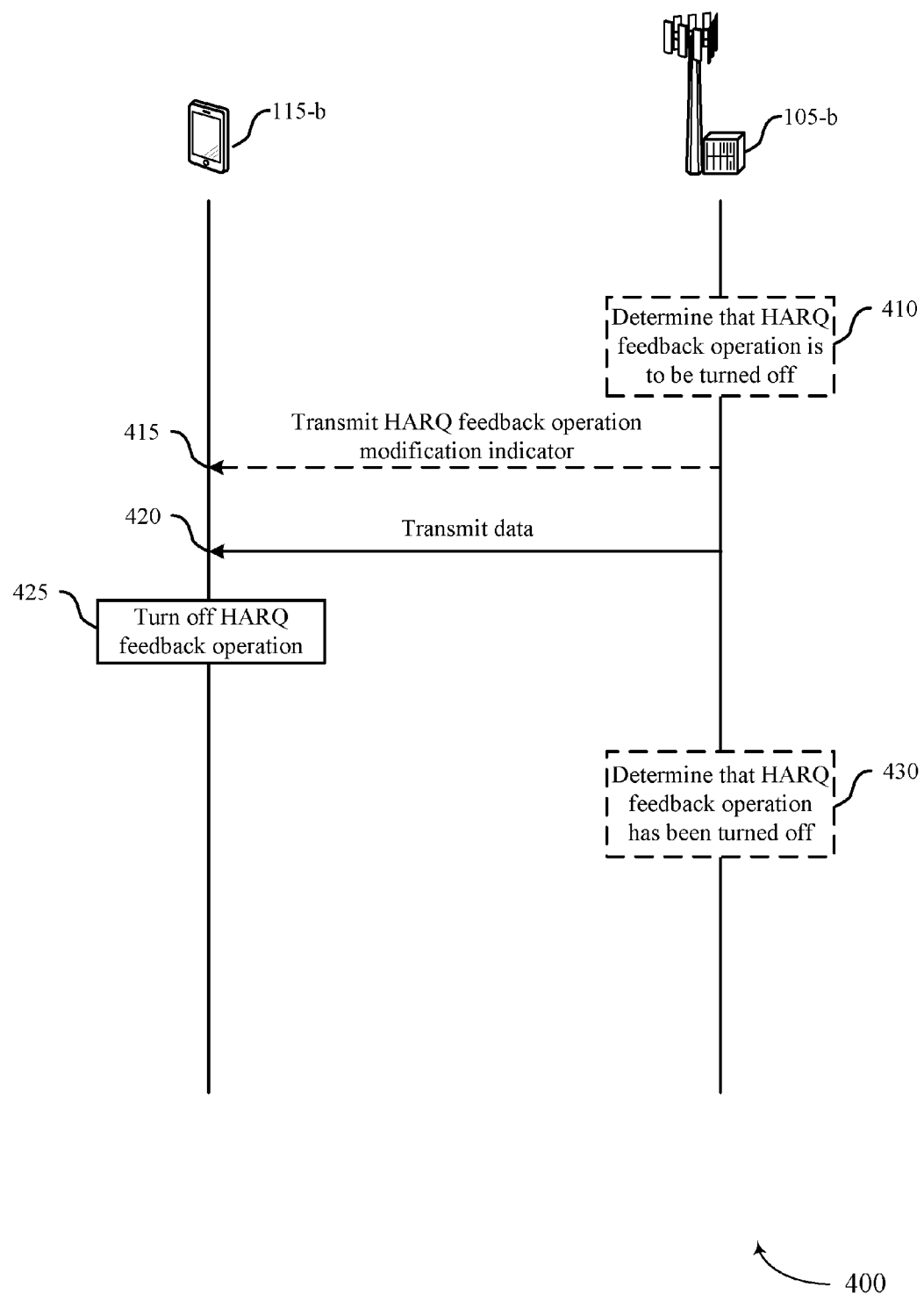
FIG. 4 illustrates an example of a process flow for a system that supports modified HARQ feedback operations, in accordance with various aspects of the present disclosure.

FIG. 4 illustrates an example of a process flow 400 for modifying HARQ feedback operations, in accordance with various aspects of the present disclosure. Process flow 400 may be performed by UE 115-b and base station 105-b which may be examples of a UE 115 or base station 105 as described above with reference to FIGS. 1 and 2. In some examples, process flow 400 illustrates an option where the UE 115-b elects to not transmit HARQ feedback.

At step 410, base station 105-b may determine that HARQ feedback operation for a specific UE 115-b may be turned off. While UE 115-b may make this determination on its own, in some circumstances, base station 105-b may make this determination and then transmit a HARQ feedback operation modification indicator to the UE 115-b. The base station 105-b may make this determination based on a preconfigured state or based on an estimate of UL channel conditions. UL channel conditions may be estimated by using sounding reference signal (SRS) transmissions, for example.

At step 415, base station 105-b may transmit to the UE 115-b a HARQ feedback operation modification indicator, which may indicate to the UE 115-b that the UE 115-b is to modify its HARQ feedback operation in accordance with the indicator. While UE 115-b may be configured to autonomously determine whether to modify its HARQ feedback operations, in at least some circumstances, the UE 115-b may act in accordance with an indicator received from the base station 105-b.

The HARQ feedback operation modification indicator may come in many forms. In one example, HARQ feedback may be enabled or disabled using a semi-static UE-specific configuration. Base station 105-b may indicate to the UE 115-b that the UE 115-b is to obtain an updated configuration which, in the example of process flow 400, disables HARQ feedback. However, because channel and traffic conditions may vary dynamically, the base station 105-b may alternatively control HARQ on/off operations using a more dynamic solution. For example, the base station 105-b may include a 1-bit indicator in a control channel (such as in a PDCCH, uPDCCH, or in an enhanced PDCCH (EPDCCH)). The 1-bit indicator may indicate whether HARQ feedback is expected for a correspondingly scheduled shared channel (such as a uPDSCH). The base station 105-b may also indicate whether HARQ feedback is to be turned off through an implicit signaling. For example, UE 115-b may be configured to turn off HARQ feedback based on specific MCS scheduled for uPDSCH received by the UE 115-b. For example, if an MCS index is high, HARQ feedback may turned on; if an MCS index is low, HARQ feedback may be turned off. The MCS threshold used to determine whether HARQ feedback should be turned on or off may be predetermined or may be RRC configured. The MCS threshold may be selected by the base station 105-b. The MCS threshold may be selected in order to ensure that a BLER is sufficiently low for communications wherein HARQ feedback is turned off.

At step 420, the base station 105-b transmits data (for example, in the form of a PDSCH) to the UE 115-b. At step 425, the UE 115-b evaluates a condition to determine whether HARQ feedback is to be turned off. The evaluated condition may include an indicator received from the base station 105-b, as explained above in connection with step 415. However, the UE 115-b may also determine to turn off HARQ feedback based on channel or traffic conditions.

In cases where the UE 115-b autonomously turns off HARQ feedback, the base station 105-b may determine that the HARQ feedback for UE 115-b has been turned off. Thus, at step 430, base station 105-b may make this determination based on a preconfigured state or based on an estimate of UL channel conditions. UL channel conditions may be estimated by using SRS transmissions, for example. Alternatively, the UE 115-b may send an indication to the base station 105-b that HARQ feedback is to be turned off or that HARQ feedback cannot be reliably provided. This indication may be periodically transmitted or aperiodically triggered, and may be part of a PHY layer payload (e.g., via uPUCCH or PUCCH), or part of a MAC layer payload (e.g., via uPUSCH or PUSCH).

Figure 5:
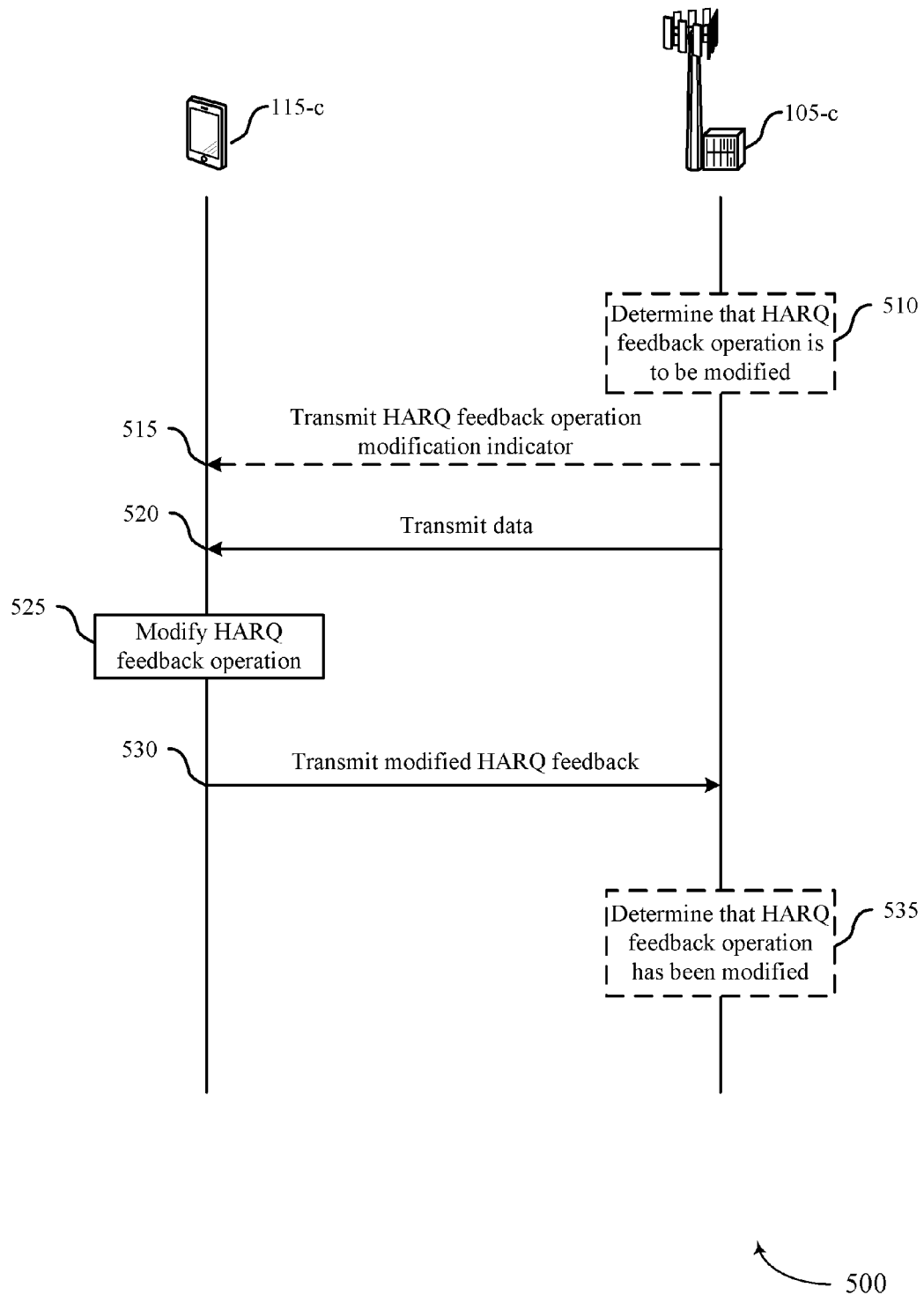
FIG. 5 illustrates an example of a process flow for a system that supports modified HARQ feedback operations, in accordance with various aspects of the present disclosure.

Another alternative to turning HARQ feedback off is to instead modify the HARQ feedback operation performed by a UE 115. FIG. 5 illustrates this alternative.

FIG. 5 illustrates an example of a process flow 500 for modifying HARQ feedback operations, in accordance with various aspects of the present disclosure. Process flow 500 may be performed by UE 115-c and base station 105-c which may be examples of a UE 115 or base station 105 as described above with reference to FIGS. 1 and 2. In some examples, process flow 500 illustrates an option where the UE 115-c elects to transmit HARQ feedback using a modified HARQ feedback operation.

At step 510, base station 105-c may determine that HARQ feedback operation for a specific UE 115-c may be modified. While UE 115-c may make this determination on its own, in some circumstances, base station 105-c may make this determination and then transmit a HARQ feedback operation modification indicator to the UE 115-c. The base station 105-c may make this determination based on a preconfigured state or based on an estimate of UL channel conditions. UL channel conditions may be estimated by using SRS transmissions, for example.

At step 515, base station 105-c may transmit to the UE 115-c a HARQ feedback operation modification indicator, which may indicate to the UE 115-c that the UE 115-c is to modify its HARQ feedback operation in accordance with the indicator. While UE 115-c may be configured to autonomously determine whether to modify its HARQ feedback operations, in at least some circumstances, the UE 115-c may act in accordance with an indicator received from the base station 105-c. In one example of the HARQ feedback operation modification indicator, HARQ feedback may be modified using a dynamic UE-specific indicator. For example, the base station 105-c may include an indicator in a control channel (such as in a PDCCH, uPDCCH, or EPDCCH). The indicator may indicate that HARQ feedback operations may be modified for a correspondingly scheduled shared channel (such as a uPDSCH).

At step 520, the base station 105-c transmits data (for example, in the form of a PDSCH) to the UE 115-c. At step 525, the UE 115-c evaluates a condition to determine whether HARQ feedback is to be modified. The evaluated condition may include an indicator received from the base station 105-c, as explained above in connection with step 515. However, the UE 115-c may also determine to modify HARQ feedback based on channel or traffic conditions.

The UE 115-c may modify its HARQ feedback operations according to different alternatives. In one alternative, the UE 115-c may provide two-state HARQ feedback instead of three-state HARQ feedback. In another alternative, the UE 115-c may normally provide three-state HARQ feedback, but may, on occasion, elect to skip HARQ feedback related to one of the typical HARQ feedback states. Thus, while a typical three-state HARQ feedback may include ACK, NAK, and DTX reporting, in these alternatives, only two of these three states may be reported.

In one alternative, ACK reporting is excluded, and only NAK and DTX reporting is included in HARQ feedback. Thus, if the UE 115-c successfully decodes the DL transmission included at step 520, or if the UE 115-c receives no DL data, the UE 115-c does not transmit HARQ feedback to the base station 105-c. If the UE 115-c does receive DL data but fails to decode the data successfully, the UE 115-c transmits HARQ feedback in the form of NAK reporting.

In another alternative, NAK reporting is excluded, and only ACK and DTX reporting is included in HARQ feedback. Thus, if the UE 115-c has received DL data at step 520 but has not decoded the data yet, the UE 115-c will use DTX reporting. Once the UE 115-c has decoded the data, the UE 115-c may include an ACK in its HARQ feedback. Once the base station 105-c receives the ACK, the base station 105-c may stop sending any re-transmissions.

The alternative above where ACK reporting is excluded may be preferentially used when the UE 115-c is near a cell center, meaning that a high majority of data transmission sent from the base station 105-c to the UE 115-c may arrive at the UE 115-c and be decoded successfully. Alternatively, if the UE 115-c is near a cell edge, the UE 115-c may elect to exclude NAK reporting from its HARQ feedback. These decisions may be made by evaluating a received power of a reference signal received at the UE 115-c. If the received power is below a predetermined threshold, NAK reporting is excluded. If the received power is above a predetermined threshold, ACK reporting is excluded.

In either of the above two alternatives, the two-state HARQ feedback may be provided using existing PUCCH formats (such as binary phase-shift keying (BPSK) or quadrature phase-shift keying (QPSK)). Because only two states are involved, ON/OFF keying may also be used for the HARQ feedback.

Another alternative is for the UE 115-c to generally use three-state HARQ feedback, but to partially skip one of the states during certain circumstances. For example, the UE 115-c may provide three-state HARQ feedback, including normally providing ACK reporting. However, the UE 115-c may elect to skip an ACK transmission in certain cases. These cases may be determined by the UE 115-c based on power limitations of the UE 115-c, or based on indicators or parameters indicated by the base station 105-c. Thus, occasionally, the UE 115-c may skip transmitting an ACK signal to the base station 105-c. As a result, the base station 105-c may not be able to distinguish between the UE 115-c being in an ACK state (when the UE 115-c successfully receives and decodes a DL transmission) and a DTX state (which the UE 115-c enters when the UE 115-c does not receive a DL grant). However, if the DL data is generally transmitted with a high reliability, the base station 105-c can generally distinguish between the UE 115-c being in an ACK state or a DTX state, and any adverse impact on system operation may be small.

One other alternative for modifying HARQ feedback is to use an UL control channel for HARQ feedback, wherein the UL control channel includes a longer TTI than that used for the DL transmission. In this case, DL transmissions may use a reduced-length TTI, while UL transmissions may use a TTI that is not as short as the reduced-length TTI.

Once the UE 115-c modifies its HARQ feedback operation, the UE 115-c may transmit HARQ feedback to the base station 105-c (at step 530). The HARQ feedback transmission may be in accordance with the modified HARQ feedback operations. Thus, in some instances, HARQ feedback may not be reported.

In cases where the UE 115-c autonomously modifies HARQ feedback, the base station 105-c may determine that the HARQ feedback for UE 115-c has been modified. Thus, at step 535, base station 105-c may make this determination based on a preconfigured state or based on an estimate of UL channel conditions. UL channel conditions may be estimated by using SRS transmissions, for example.

Figure 6:
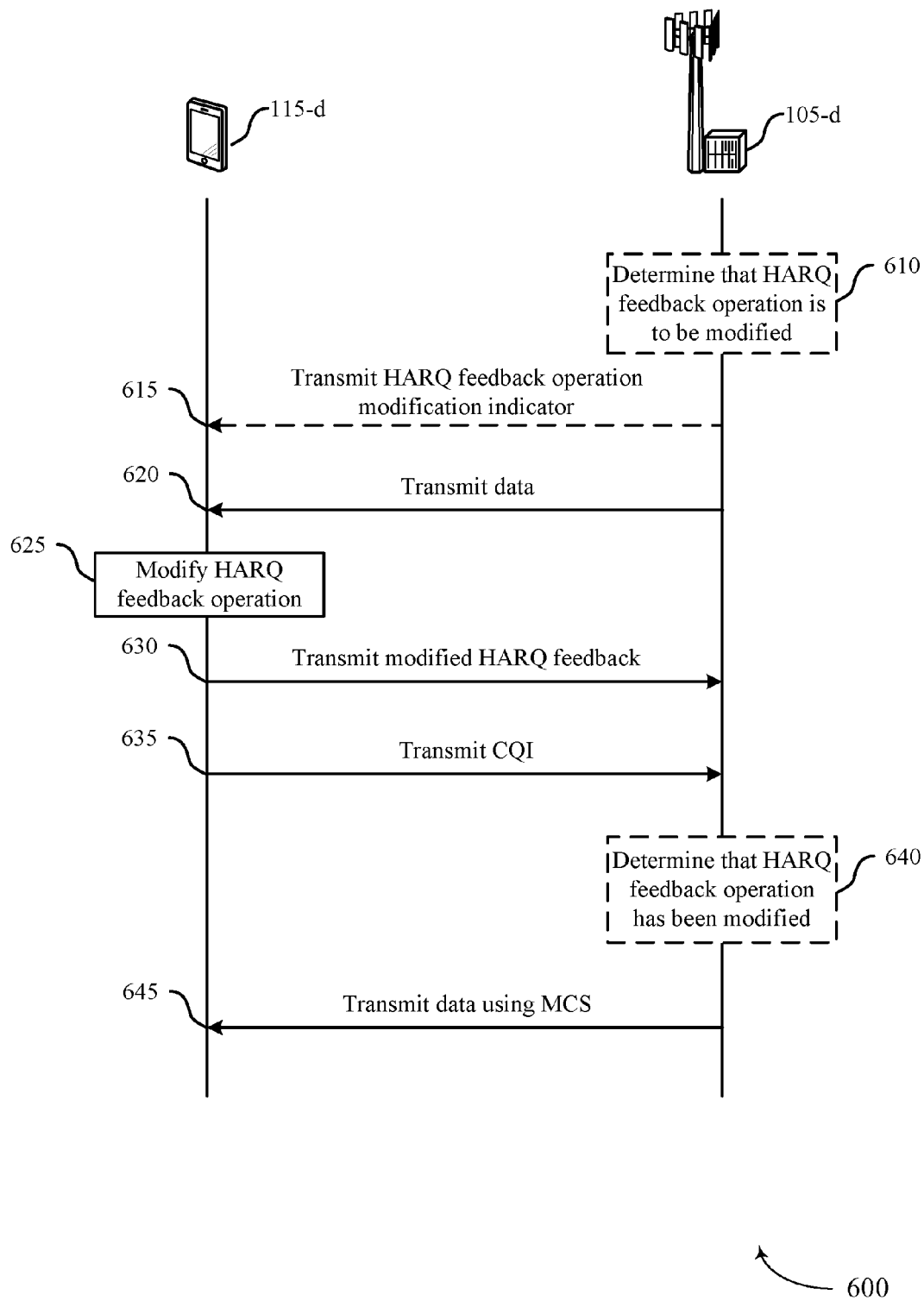
FIG. 6 illustrates an example of a process flow for a system that supports modified HARQ feedback operations, in accordance with various aspects of the present disclosure.

FIG. 6 illustrates an example of a process flow 600 for modifying HARQ feedback operations, in accordance with various aspects of the present disclosure. Process flow 600 may be performed by UE 115-d and base station 105-d which may be examples of a UE 115 or base station 105 as described above with reference to FIGS. 1 and 2. In some examples, process flow 600 illustrates an option where the UE 115-d elects to transmit HARQ feedback using a modified HARQ feedback operation and to also transmit CQI based on the modified HARQ feedback operation.

At step 610, base station 105-d may determine that HARQ feedback operation for a specific UE 115-d may be modified. While UE 115-d may make this determination on its own, in some circumstances, base station 105-d may make this determination and then transmit a HARQ feedback operation modification indicator to the UE 115-d. The base station 105-d may make this determination based on a preconfigured state or based on an estimate of UL channel conditions. UL channel conditions may be estimated by using SRS transmissions, for example.

At step 615, base station 105-d may transmit to the UE 115-d a HARQ feedback operation modification indicator, which may indicate to the UE 115-d that the UE 115-d is to modify its HARQ feedback operation in accordance with the indicator. While UE 115-d may be configured to autonomously determine whether to modify its HARQ feedback operations, in at least some circumstances, the UE 115-d may act in accordance with an indicator received from the base station 105-d. In one example of the HARQ feedback operation modification indicator, HARQ feedback may be modified using a dynamic UE-specific indicator. For example, the base station 105-d may include an indicator in a control channel (such as in a PDCCH, uPDCCH, or EPDCCH). The indicator may indicate that HARQ feedback operations may be modified for a correspondingly scheduled shared channel (such as a uPDSCH).

At step 620, the base station 105-d transmits data (for example, in the form of a PDSCH) to the UE 115-d. At step 625, the UE 115-d evaluates a condition to determine whether HARQ feedback is to be modified. The evaluated condition may include an indicator received from the base station 105-d, as explained above in connection with step 615. However, the UE 115-d may also determine to modify HARQ feedback based on channel or traffic conditions. The UE 115-d may elect to modify HARQ feedback operations by either turning off HARQ feedback or by simplifying HARQ feedback from a three-state ACK/NAK/DTX feedback to a two-state HARQ feedback, as described above with respect to FIGS. 4 and 5.

Once the UE 115-d modifies its HARQ feedback operation, the UE 115-d may transmit HARQ feedback to the base station 105-d (at step 630). The HARQ feedback transmission may be in accordance with the modified HARQ feedback operations. Thus, in some instances, HARQ feedback may not be reported.

The UE 115-d may also transmit CQI to the base station 105-d (at step 635). In its CQI reporting, the UE 115-d may elect to use modified CQI indices in its CQI transmissions to the base station 105-d. The CQI indices may be modified to correspond to the HARQ feedback operation modifications made by the UE 115-d. Conventionally, CQI indices are generally based on a same target BLER. However, if the UE 115-d is modifying its HARQ feedback operations such that HARQ feedback or aspects of HARQ feedback are not transmitted to the base station 105-d, the UE 115-d may elect to use a different target BLER for at least some of the CQI indices that may be sent to the base station 105-d. For example, for some CQI indices (e.g., CQI indices 1-5), the UE 115-d may assume a 10% initial BLER, while for other CGI indices (e.g., CQI indices 6-15), the UE 115-d may assume a 1% initial BLER. The UE 115-d may be more prone to report a CQI index having a lower initial BLER during times when HARQ feedback operations are suspended or otherwise modified.

In cases where the UE 115-d autonomously modifies HARQ feedback, the base station 105-d may determine that the HARQ feedback for UE 115-d has been modified. Thus, at step 640, base station 105-d may make this determination based on a preconfigured state or based on an estimate of UL channel conditions. UL channel conditions may be estimated by using SRS transmissions, for example.

By determining that the UE 115-d has modified its HARQ feedback operation, the base station 105-d may also determine that the CQI index received (via step 635) may be based on a different BLER. Accordingly, the base station 105-d may elect to apply MCS indices that are also based on a corresponding BLER. Thus, at step 645, the base station 105-d may transmit data to the UE 115-d using an MCS that is based on different HARQ termination targets.

Figure 7:
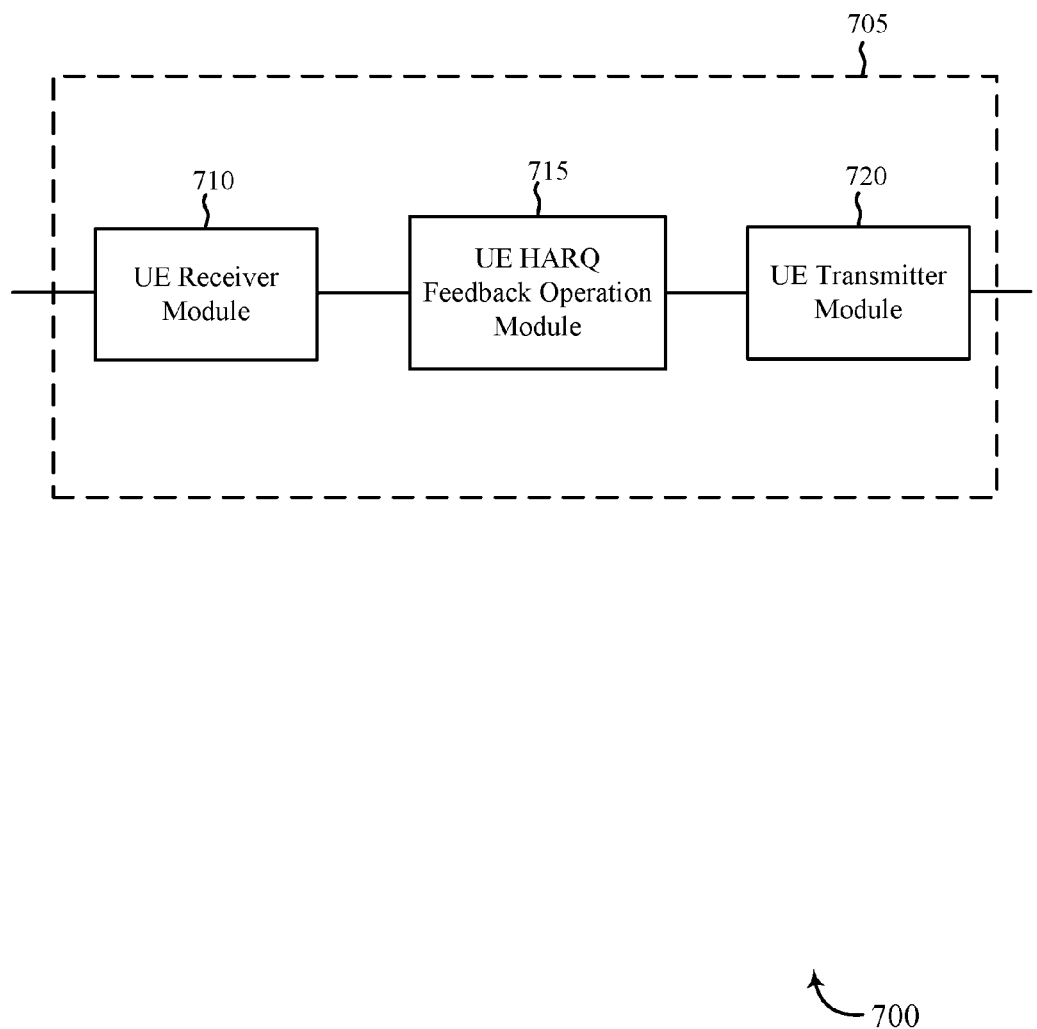
FIGS. 7 and 8 show block diagrams of wireless devices that support modified HARQ feedback operations, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIGS. 1-6. The device 705 may include a UE receiver module 710, a UE HARQ feedback operation module 715, and/or a UE transmitter module 720. The device 705 may also be or include a processor (not shown). Each of these modules may be in communication with each other.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The UE receiver module 710 may receive information such as packets, user data, and/or control information associated with various information channels (e.g., control channels, data channels, etc.). The UE receiver module 710 may be configured to receive indications from a base station that the device 705 is to modify its HARQ feedback operations. The UE receiver module 710 may also be configured to receive data transmissions for which modified HARQ feedback may be reported. Information may be passed on to the UE HARQ feedback operation module 715, and to other components of the device 705.

The UE HARQ feedback operation module 715 may be used to evaluate a condition for determining how to provide HARQ feedback in response to a received data transmission, and to modify a HARQ feedback operation based on the evaluated condition. For example, the device 705 may receive an indication from a base station that HARQ feedback operations by the device 705 are to be modified. Alternatively, the UE HARQ feedback operation module 715 may autonomously determine, based on channel or traffic conditions, that HARQ feedback operations are to be modified. If modifications are to be made, the UE HARQ feedback operation module 715 may modify its HARQ feedback operations by turning off HARQ feedback, by reducing HARQ feedback from a three-state feedback to a two-state feedback, by occasionally skipping a reporting state, or by using a sufficiently long TTI for the HARQ feedback.

The UE transmitter module 720 may transmit the one or more signals received from other components of the device 705. The UE transmitter module 720 may transmit HARQ feedback, as modified by the UE HARQ feedback operation module 715. The UE transmitter module 720 may also transmit CQI, which may include a CQI index selected from among CQI indices that are based on different BLER targets. In some examples, the UE transmitter module 720 may be collocated with the UE receiver module 710 in a transceiver module.

Figure 8:
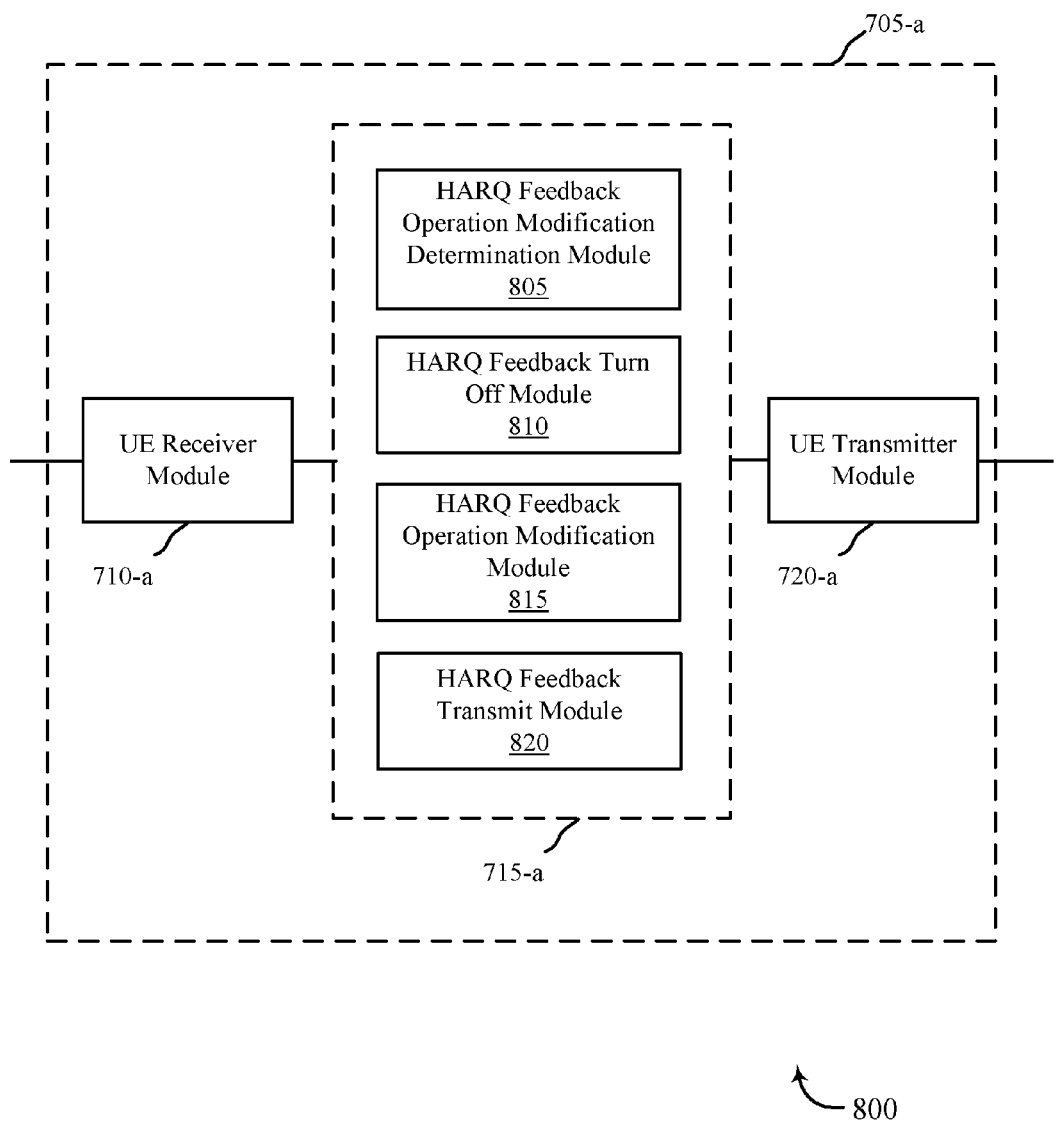

FIG. 8 shows a block diagram 800 of a device 705-a for use in wireless communication, in accordance with various examples. The device 705-a may be an example of one or more aspects of a UE 115 described with reference to FIGS. 1-6. It may also be an example of a device 705 described with reference to FIG. 7. The device 705-a may include a UE receiver module 710-a, a UE HARQ feedback operation module 715-a, and/or a UE transmitter module 720-a, which may be examples of the corresponding modules of device 705. The device 705-a may also include a processor (not shown). Each of these components may be in communication with each other. The UE HARQ feedback operation module 715-a may include a HARQ feedback operation modification determination module 805, a HARQ feedback turn off module 810, a HARQ feedback operation modification module 815, and/or a HARQ feedback transmit module 820. The UE receiver module 710-a and the UE transmitter module 720-a may perform the functions of the UE receiver module 710 and the UE transmitter module 720, of FIG. 7, respectively.

The HARQ feedback operation modification determination module 805 may be used by the device 705-a to determine if a HARQ feedback operation is to be modified. The HARQ feedback operation modification determination module 805 may make this determination by evaluating a condition. The evaluated condition may be in the form of an indicator received from a base station. For example, a base station may transmit to the device 705-*a* a HARQ feedback operation modification indicator, which may indicate to the device 705-*a* that the device 705-*a* is to modify its HARQ feedback operation in accordance with the indicator. The HARQ feedback operation modification indicator may come in many forms. In one example, HARQ feedback may be enabled or disabled using a semi-static UE-specific configuration. A base station may indicate to the device 705-*a* that the device 705-*a* is to obtain an updated configuration which may disable HARQ feedback. The HARQ feedback operation modification determination module 805 may alternatively receive an indicator in a control channel (such as in a PDCCH, uPDCCH, or EPDCCH) that indicates whether HARQ feedback is expected or may be turned off, or if the HARQ feedback is to be modified. The HARQ feedback operation modification determination module 805 may also evaluate implicit signaling received from a base station that may indicate that HARQ feedback operations are to be modified. For example, the use of specific MCS scheduled by a base station may indicate to the device 705-*a* that HARQ feedback operations are to be modified.

Alternatively, the HARQ feedback operation modification determination module 805 may evaluate channel or traffic conditions and autonomously determine that HARQ feedback operations are to be modified. The HARQ feedback operation modification determination module 805 may evaluate power limitations of the device 705-*a* in making its decision, and may also consider a received power of a reference signal in determining the channel and traffic conditions that may be used as a basis for HARQ feedback operation modification.

The HARQ feedback turn off module 810 may be used to turn off HARQ feedback. The HARQ feedback turn off module 810 may communicate with the HARQ feedback operation modification determination module 805 to determine whether HARQ feedback operations are to be modified and, if so, whether the modifications include turning off HARQ feedback. In accordance with the HARQ feedback operation modification determination module 805, the HARQ feedback turn off module 810 may disable HARQ feedback operations by applying, for example, a semi-static device-specific configuration, or by using a dynamic HARQ ON/OFF operation based on either explicit or implicit signaling from a base station. Additionally, the HARQ feedback turn off module 810 may elect to disable HARQ feedback operations based on an autonomous decision of the HARQ feedback operation modification determination module 805.

The HARQ feedback operation modification module 815 may be used to modify HARQ feedback operations. For example, the HARQ feedback operation modification module 815 may be used to change HARQ feedback operation from a three-stage to a two-stage reporting operation. In one example, ACK reporting may be excluded. In another example, NAK reporting may be excluded. In some examples, three-stage HARQ reporting may be typically used, though the device 705-*a* may elect to occasionally skip the reporting of a stage. The HARQ feedback operation modification module 815 may communicate with the HARQ feedback operation modification determination module 805 to determine whether HARQ feedback operations are to be modified.

The HARQ feedback transmit module 820 may be used to transmit the modified HARQ feedback. The HARQ feedback transmit module 820 may coordinate its functions with the UE transmitter module 720-*a*, for example. In some instances where HARQ feedback is not being reported, the HARQ feedback transmit module 820 may be unused.

Figure 9:
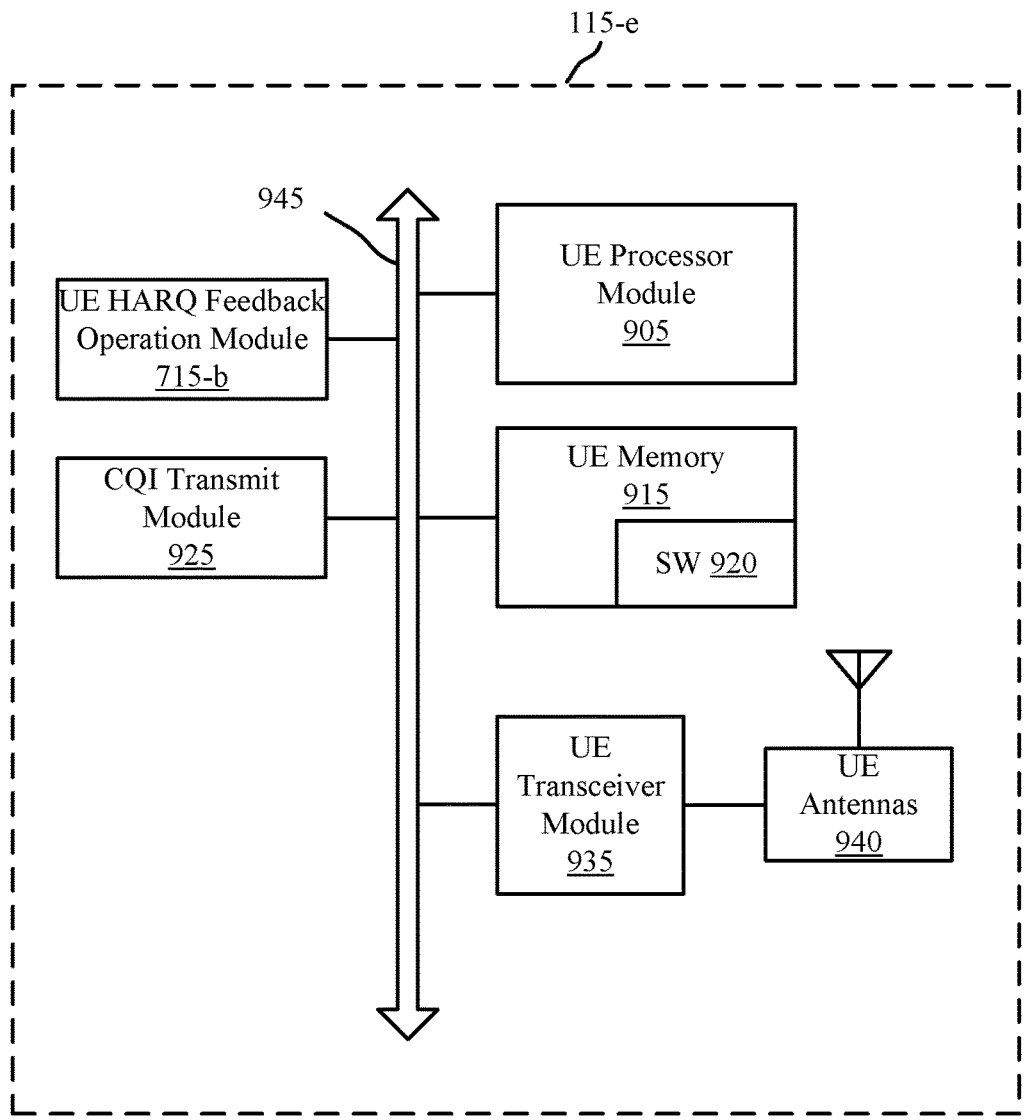
FIG. 9 illustrates a system including a user equipment (UE) that supports modified HARQ feedback operations, in accordance with various aspects of the present disclosure.

FIG. 9 shows a system 900 for use in wireless communication, in accordance with various examples. System 900 may include a UE 115-*e*, which may be an example of the UEs 115 of FIGS. 1-6. UE 115-*e* may also be an example of one or more aspects of devices 705 of FIGS. 7 and 8.

The UE 115-*e* may generally include components for bi-directional voice and data communications including components for transmitting communications and components for receiving communications. The UE 115-*e* may include UE antenna(s) 940, a UE transceiver module 935, a UE processor module 905, and UE memory 915 (including software (SW) 920), which each may communicate, directly or indirectly, with each other (e.g., via one or more buses 945). The UE transceiver module 935 may be configured to communicate bi-directionally, via the UE antenna(s) 940 and/or one or more wired or wireless links, with one or more networks, as described above. For example, the UE transceiver module 935 may be configured to communicate bi-directionally with base stations 105 with reference to FIGS. 1-6. The UE transceiver module 935 may include a modem configured to modulate the packets and provide the modulated packets to the UE antenna(s) 940 for transmission, and to demodulate packets received from the UE antenna(s) 940. While the UE 115-*e* may include a single UE antenna 940, the UE 115-*e* may have multiple UE antennas 940 capable of concurrently transmitting and/or receiving multiple wireless transmissions. The UE transceiver module 935 may be capable of concurrently communicating with one or more base stations 105 via multiple component carriers.

The UE 115-*e* may include a UE HARQ feedback operation module 715-*b*, which may perform the functions described above for the UE HARQ feedback operation modules 715 of device 705 of FIGS. 7 and 8. The UE 115-*e* may also include a CQI transmit module 925. The CQI transmit module 925 may be used by the UE 115-*e* to transmit CQI in the form of a CQI index. The CQI index may be selected from among a plurality or set of available CQI indices. The CQI indices may be based on different BLER targets. The CQI transmit module 925 may select a CQI index to send to a base station based on whether HARQ feedback operations have been modified and, if so, based on a CQI index associated with a BLER target that is appropriate for the HARQ feedback operation modifications.

The UE memory 915 may include random access memory (RAM) and read-only memory (ROM). The UE memory 915 may store computer-readable, computer-executable software/firmware code 920 containing instructions that are configured to, when executed, cause the UE processor module 905 to perform various functions described herein (e.g., modify HARQ feedback operations, etc.). Alternatively, the computer-readable, computer-executable software/firmware code 920 may not be directly executable by the UE processor module 905 but be configured to cause a computer (e.g., when compiled and executed) to perform functions described herein. The UE processor module 905 may include an intelligent hardware device (e.g., a central processing unit (CPU), a microcontroller, an ASIC, etc.).

Figure 10:
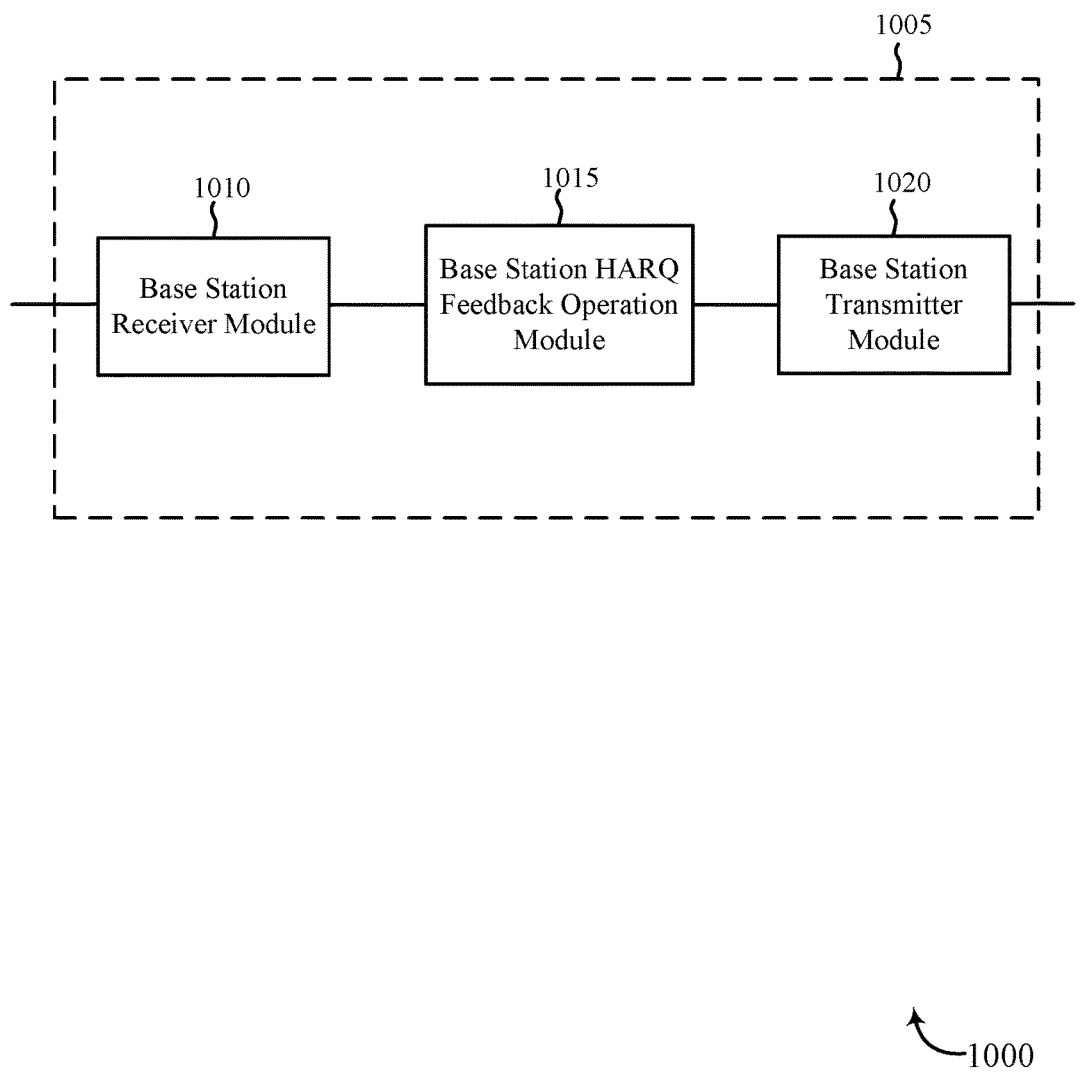
FIGS. 10 and 11 show block diagrams of wireless devices that support modified HARQ feedback operations, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIGS. 1-6. In some examples, the apparatus 1005 may be part or include an LTE/LTE-A eNB and/or an LTE/LTE-A base station. The apparatus 1005 may also be a processor. The apparatus 1005 may include a base station receiver module 1010, a base station HARQ feedback operation module 1015, and/or a base station transmitter module 1020. Each of these modules may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the base station receiver module 1010 may include at least one radio frequency (RF) receiver, such as an RF receiver operable to receive modified HARQ feedback from a device such as a UE. The base station receiver module 1010 may also be operable to receive CQI reporting that may be based on BLER targets associated with HARQ feedback operation modification. The base station receiver module 1010 may be used to receive various types of data and/or control signals (i.e., transmissions) over one or more communication links of a wireless communication system, such as one or more communication links of the wireless communications system 100 described with reference to FIG. 1.

In some examples, the base station transmitter module 1020 may include at least one RF transmitter, such as at least one RF transmitter operable to transmit indicators to a receiving device (such as a UE) that HARQ feedback operations are to be turned off or otherwise modified. The base station transmitter module 1020 may also be operable to transmit data encoded using MCS that may indicate to a receiving device that HARQ feedback operations are to be modified. The selected MCS index may be used based on varying BLER targets corresponding to whether HARQ feedback operations are to be modified. The base station transmitter module 1020 may be used to transmit various types of data and/or control signals (i.e., transmissions) over one or more communication links of a wireless communication system, such as one or more communication links of the wireless communications system 100 described with reference to FIG. 1.

In some examples, the base station HARQ feedback operation module 1015 may be operable to determine whether HARQ feedback operations at a receiving device are to be modified. The base station HARQ feedback operation module 1015 may render this determination by evaluating channel or traffic conditions or by receiving information from a receiving device. The apparatus 1005 may transmit an indication to a receiving device such as a UE that HARQ feedback operations by the receiving device are to be modified. The base station HARQ feedback operation module 1015 may also coordinate receipt of modified HARQ feedback and the determination or detection of when received HARQ feedback has been modified.

Figure 11:
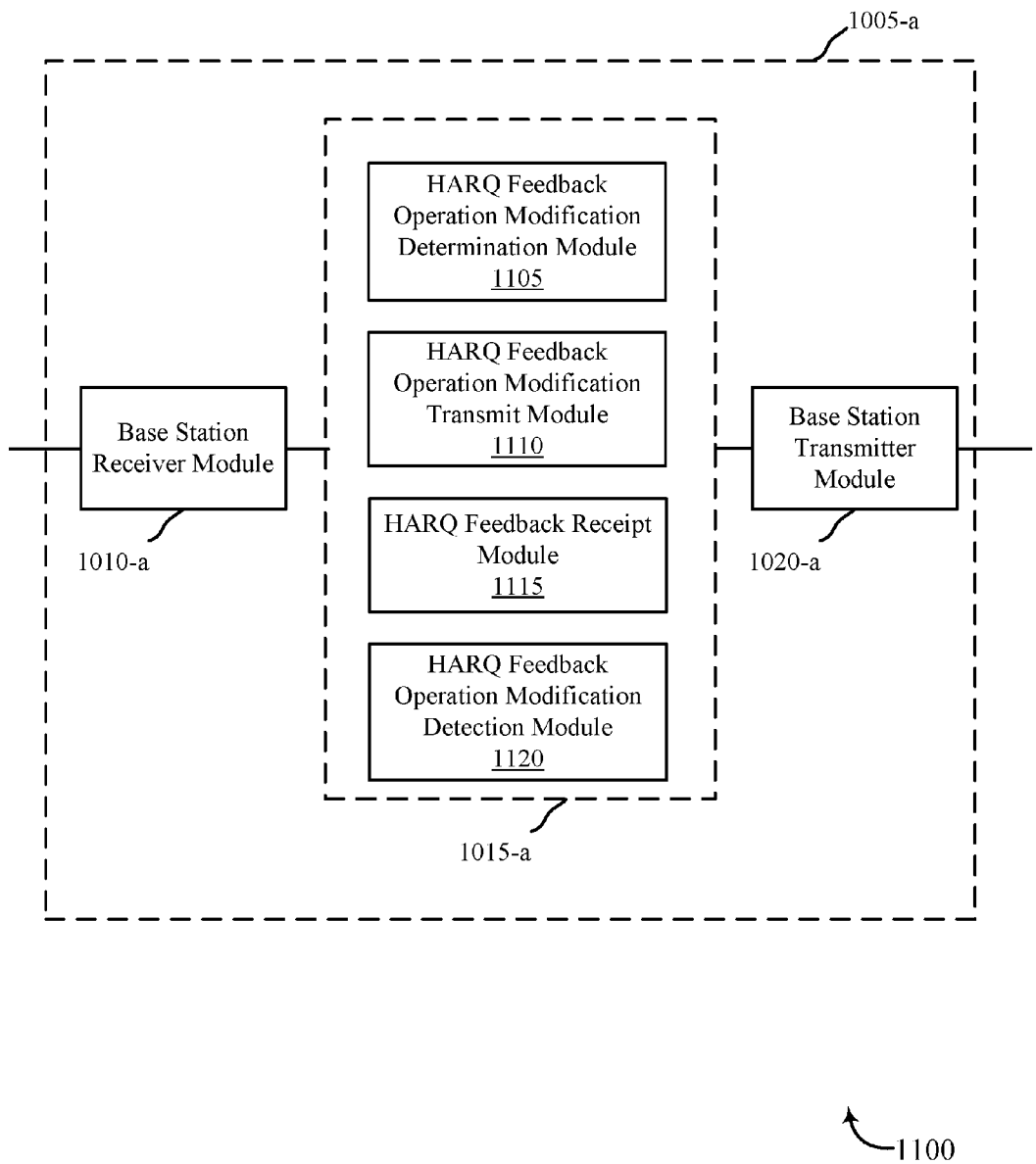

FIG. 11 shows a block diagram 1100 of an apparatus 1005-a for use in wireless communication, in accordance with various aspects of the present disclosure. In some examples, the apparatus 1005-a may be an example of aspects of one or more of the base stations 105 described with reference to FIGS. 1-6, and/or an example of aspects of the apparatus 1005 described with reference to FIG. 10. In some examples, the apparatus 1005-a may be part or include an LTE/LTE-A eNB and/or an LTE/LTE-A base station. The apparatus 1005-a may also be a processor. The apparatus 1005-a may include a base station receiver module 1010-a, a base station HARQ feedback operation module 1015-a, and/or a base station transmitter module 1020-a. Each of these modules may be in communication with each other.

The components of the apparatus 1005-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the base station receiver module 1010-a may be an example of one or more aspects of the base station receiver module 1010 described with reference to FIG. 10. In some examples, the base station receiver module 1010-a may include at least one RF receiver, such as at least one RF receiver operable to receive modified HARQ feedback. The base station receiver module 1010-a may be used to receive various types of data and/or control signals (i.e., transmissions) over one or more communication links of a wireless communication system, such as one or more communication links of the wireless communications system 100 described with reference to FIG. 1.

In some examples, the base station transmitter module 1020-a may be an example of one or more aspects of the base station transmitter module 1020 described with reference to FIG. 10. In some examples, the base station transmitter module 1020-a may include at least one RF transmitter, such as at least one RF transmitter operable to transmit an indication to a receiving device that HARQ feedback operations are to be modified. The base station transmitter module 1020-a may be used to transmit various types of data and/or control signals (i.e., transmissions) over one or more communication links of a wireless communications system, such as one or more communication links of the wireless communications system 100 described with reference to FIG. 1.

The base station HARQ feedback operation module 1015-a may include a HARQ feedback operation modification determination module 1105, a HARQ feedback operation modification transmit module 1110, a HARQ feedback receipt module 1115, and/or a HARQ feedback operation modification detection module 1120.

The HARQ feedback operation modification determination module 1105 may be used by the apparatus 1005-a to determine whether a receiving device such as a UE should modify its HARQ feedback operations. The HARQ feedback operation modification determination module 1105 may evaluate channel or traffic conditions to make this determination. Alternatively, the HARQ feedback operation modification determination module 1105 may evaluate information received from a receiving device in order to make this decision.

The HARQ feedback operation modification transmit module 1110 may transmit an indication to a receiving device that HARQ feedback operations are to be modified.

The HARQ feedback operation modification transmit module 1110 may be used to transmit, for example, a semi-static device-specific configuration that includes HARQ feedback disabling. The HARQ feedback operation modification transmit module 1110 may also be used to transmit an explicit or implicit signaling that HARQ feedback operations are to be modified. The explicit signaling may include an indicator in a control channel, while implicit signaling may include the use of specific MCS in data transmissions that can signal a receiving device that HARQ feedback operations may be modified. The HARQ feedback operation modification transmit module 1110 may indicate that HARQ feedback is to be turned off. The HARQ feedback operation modification transmit module 1110 may also indicate that HARQ feedback operations are to be modified such that either ACK or NAK reporting is excluded.

The HARQ feedback receipt module 1115 may be used by the apparatus 1005-*a* to receive modified HARQ feedback sent by a UE, for example. The modified HARQ feedback may, in some cases, not include either ACK or NAK reporting.

The HARQ feedback operation modification detection module 1120 may be used by the apparatus 1005-*a* to detect whether HARQ feedback received from a UE, for example, has been modified through a modified HARQ feedback operation. In cases where a UE autonomously elects to modify its HARQ feedback operations, the apparatus 1005-*a* may detect this by using the HARQ feedback operation modification detection module 1120. The HARQ feedback operation modification detection module 1120 may detect an explicit indication sent by a UE that HARQ feedback operations have been modified. Alternatively, the HARQ feedback operation modification detection module 1120 may detect modification through estimating channel and traffic conditions by using SRS transmissions, for example.

Figure 12:
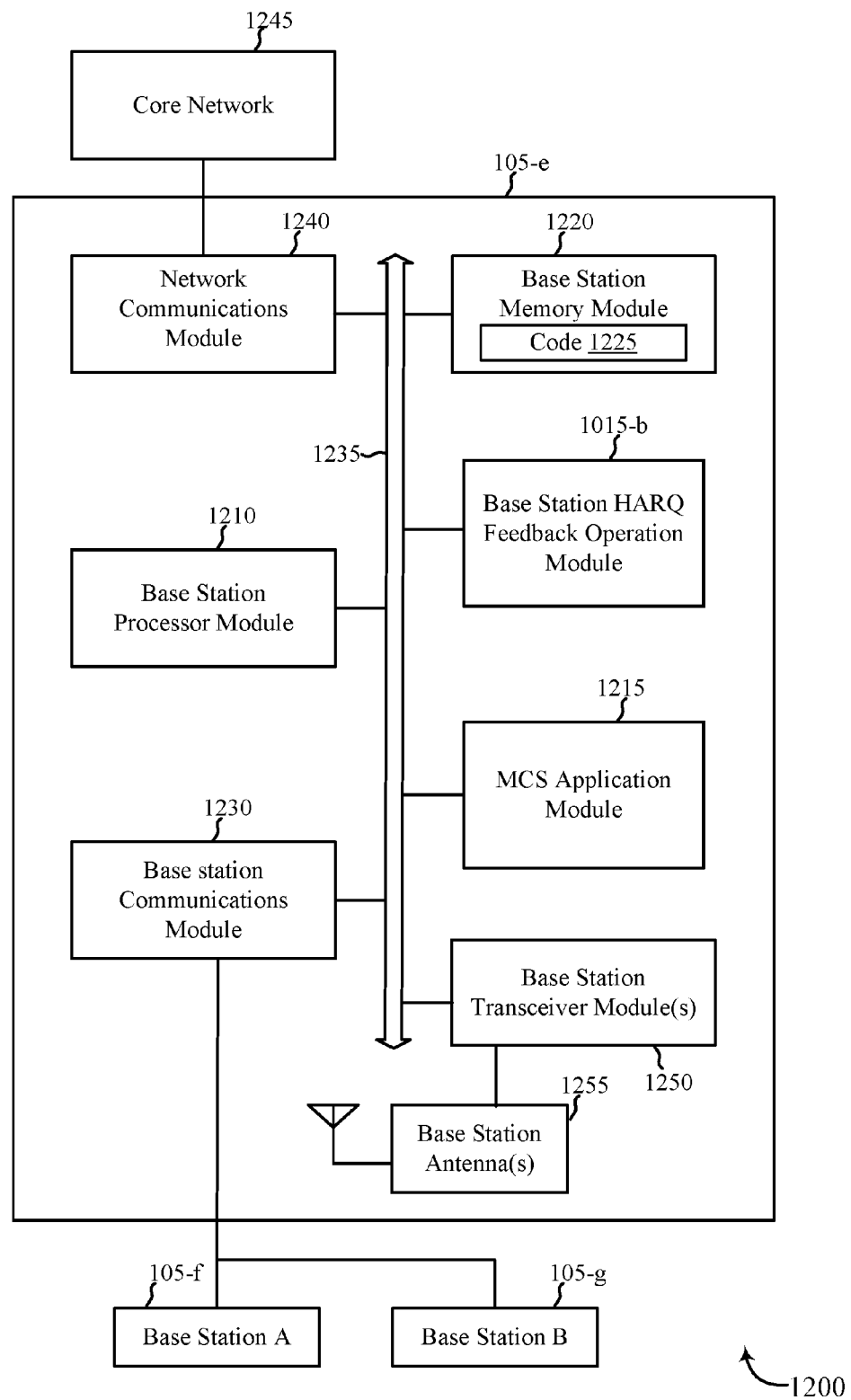
FIG. 12 illustrates a system including a base station that supports modified HARQ feedback operations, in accordance with various aspects of the present disclosure.

FIG. 12 shows a block diagram 1200 of a base station 105-*e* (e.g., a base station forming part or all of an eNB) for use in wireless communication, in accordance with various aspects of the present disclosure. In some examples, the base station 105-*e* may be an example of aspects of one or more of the base stations 105 described with reference to FIGS. 1-6, and/or aspects of one or more of the apparatus 1005 when configured as a base station, as described with reference to FIGS. 10 and/or 11. The base station 105-*e* may be configured to implement or facilitate at least some of the base station and/or apparatus features and functions described with reference to FIGS. 1-6, 10, and 11.

The base station 105-*e* may include a base station processor module 1210, a base station memory module 1220, at least one base station transceiver module (represented by base station transceiver module(s) 1250), at least one base station antenna (represented by base station antenna(s) 1255), and/or a base station HARQ feedback operation module 1015-*b*. The base station 105-*e* may also include one or more of a base station communications module 1230 and/or a network communications module 1240. Each of these modules may be in communication with each other, directly or indirectly, over one or more buses 1235.

The base station memory module 1220 may include RAM and/or ROM. The base station memory module 1220 may store computer-readable, computer-executable software/firmware code 1225 containing instructions that are configured to, when executed, cause the base station processor module 1210 to perform various functions described herein related to wireless communication (e.g., transmitting indications that HARQ feedback operations are to be modified, etc.). Alternatively, the computer-readable, computer-executable software/firmware code 1225 may not be directly executable by the base station processor module 1210 but be configured to cause the base station 1205 (e.g., when compiled and executed) to perform various of the functions described herein.

The base station processor module 1210 may include an intelligent hardware device (e.g., a CPU, a microcontroller, an ASIC, etc.). The base station processor module 1210 may process information received through the base station transceiver module(s) 1250, the base station communications module 1230, and/or the network communications module 1240.

The base station processor module 1210 may also process information to be sent to the transceiver module(s) 1250 for transmission through the antenna(s) 1255, to the base station communications module 1230, for transmission to one or more other base stations 105-*f* and 105-*g*, and/or to the network communications module 1240 for transmission to a core network 1245, which may be an example of one or more aspects of the core network 130 described with reference to FIG. 1. The base station processor module 1210 may handle, alone or in connection with the base station HARQ feedback operation module 1015-*b*, various aspects of managing the modification of HARQ feedback operations at receiving devices such as UEs.

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in a first radio frequency spectrum band and/or a second radio frequency spectrum band. The base station transceiver module(s) 1250 may be configured to communicate bi-directionally, via the antenna(s) 1255, with one or more UEs or apparatuses, such as one or more of the UEs 115 described with reference to FIGS. 1-6 and 9. The base station 105-*e* may, for example, include multiple base station antennas 1255 (e.g., an antenna array). The base station 105-*e* may communicate with the core network 1245 through the network communications module 1240. The base station 105-*e* may also communicate with other base stations, such as the base stations 105-*f* and 105-*g*, using the base station communications module 1230.

The base station HARQ feedback operation module 1015-*b* may be configured to perform and/or control some or all of the features and/or functions described with reference to FIGS. 1-6, 10, and 11 related to modifying HARQ feedback operations. In some examples, the base station HARQ feedback operation module 1015-*b* may be used to indicate to a UE that the UE is to modify its HARQ feedback operations by turning HARQ feedback off or by simplifying HARQ feedback from a three-state feedback to a two-state feedback. The base station HARQ feedback operation module 1015-*b*, or portions of the base station HARQ feedback operation module 1015-*b*, may include a processor, and/or some or all of the functions of the base station HARQ feedback operation module 1015-*b* may be performed by the base station processor module 1210 and/or in connection with the base station processor module 1210. In some examples, the base station HARQ feedback operation module 1015-*b* may be an example of the base station HARQ feedback operation module 1015 and/or 1015-*a* described with reference to FIGS. 10 and/or 11.

The base station 105-*e* may also include an MCS application module 1215. The MCS application module 1215 may be used by the base station 105-*e* to determine an MCS index from a plurality of MCS indices for use in data transmission to a receiving device such as a UE. At least some of the plurality of MCS indices may be associated with different target BLERs. The MCS application module 1215 may be used to coordinate the sending of a data transmission to a receiving device using the selected MCS index. The MCS application module 1215 may be further used to associate different BLERs with the some of the MCS indices base in part on whether the receiving device is reporting HARQ feedback or whether the receiving device is reporting HARQ feedback using a modified HARQ feedback operation.

Figure 13:
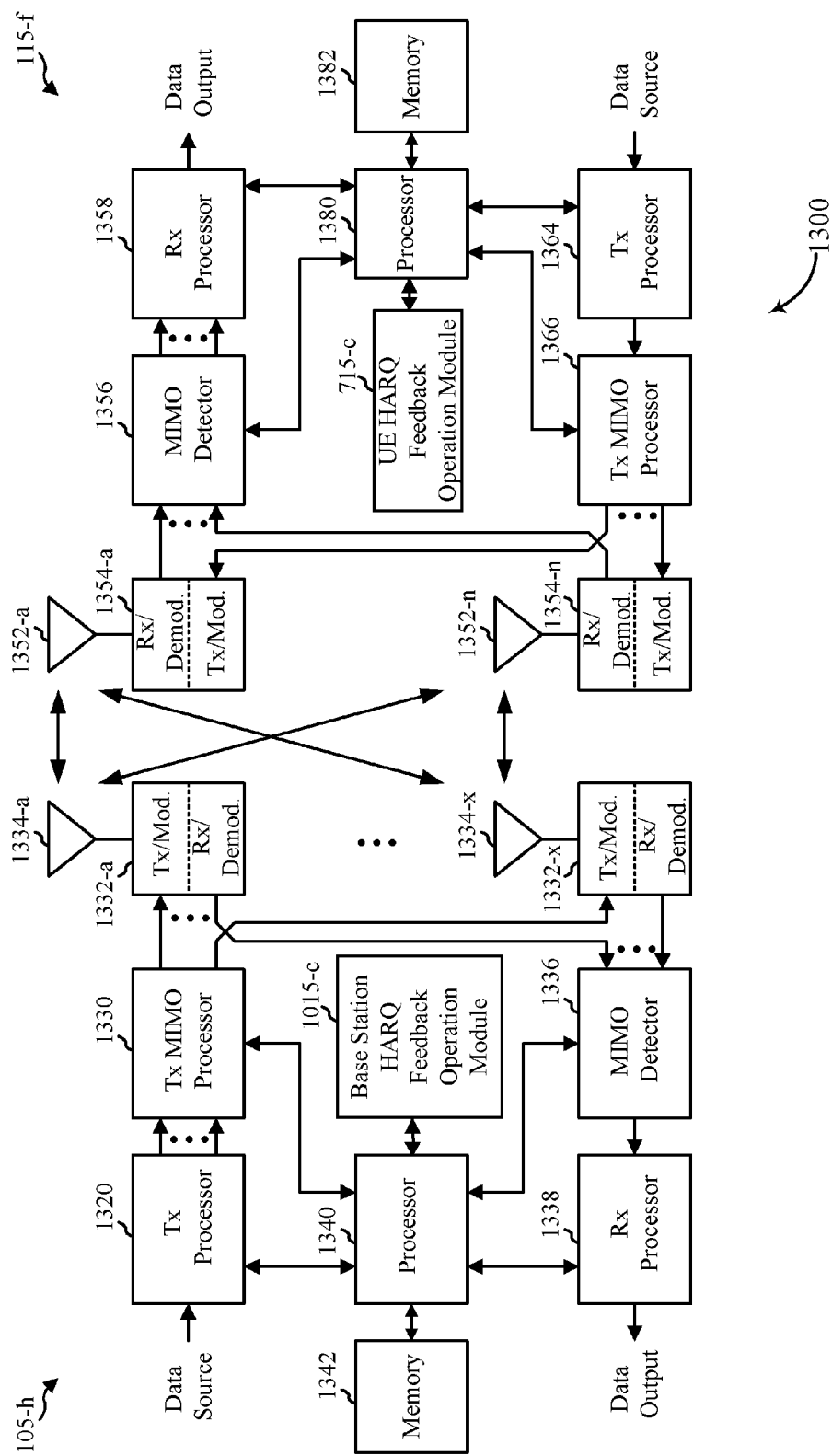
FIG. 13 shows a diagram of a multiple-input/multiple-output communication system, in accordance with various aspects of the present disclosure.

FIG. 13 is a diagram of a multiple input/multiple output (MIMO) communication system 1300 including a base station 105-*h* and a UE 115-*f*. The MIMO communication system 1300 may illustrate aspects of the wireless communications system 100 shown in FIG. 1. The base station 105-*h* may be equipped with antennas 1334-*a* through 1334-*x*, and the UE 115-*f* may be equipped with antennas 1352-*a* through 1352-*n*. In the MIMO communication system 1300, the base station 105-*h* may be able to send data over multiple communication links at the same time. Each communication link may be called a "layer" and the "rank" of the communication link may indicate the number of layers used for communication. For example, in a 2×2 MIMO communications system where base station 105-*h* transmits two "layers," the rank of the communication link between the base station 105-*h* and the UE 115-*f* is two.

At the base station 105-*h*, a transmit processor 1320 may receive data from a data source. The transmit processor 1320 may process the data. The transmit processor 1320 may also generate control symbols and/or reference symbols. A transmit (TX) MIMO processor 1330 may perform spatial processing (e.g., precoding) on data symbols, control symbols, and/or reference symbols, if applicable, and may provide output symbol streams to the modulator/demodulators 1332-*a* through 1332-*x*. Each modulator/demodulator 1332 may process a respective output symbol stream (e.g., for OFDM, etc.) to obtain an output sample stream. Each modulator/demodulator 1332 may further process (e.g., convert to analog, amplify, filter, and upconvert) the output sample stream to obtain a DL signal. In one example, DL signals from modulator/demodulators 1332-*a* through 1332-*x* may be transmitted via the antennas 1334-*a* through 1334-*x*, respectively.

At the UE 115-*f*, the UE antennas 1352-*a* through 1352-*n* may receive the DL signals from the base station 105-*h* and may provide the received signals to the modulator/demodulators 1354-*a* through 1354-*n*, respectively. Each modulator/demodulator 1354 may condition (e.g., filter, amplify, downconvert, and digitize) a respective received signal to obtain input samples. Each modulator/demodulator 1354 may further process the input samples (e.g., for OFDM, etc.) to obtain received symbols. A MIMO detector 1356 may obtain received symbols from all the modulator/demodulators 1354-*a* through 1354-*n*, perform MIMO detection on the received symbols, if applicable, and provide detected symbols. A receive processor 1358 may process (e.g., demodulate, deinterleave, and decode) the detected symbols, providing decoded data for the UE 115-*f* to a data output, and provide decoded control information to a processor 1380, or memory 1382.

The processor 1380 may in some cases execute stored instructions to instantiate one or more of a UE HARQ feedback operation module 715-*c*. The UE HARQ feedback operation module 715-*c* may be an example of aspects of the UE HARQ feedback operation module 715 described with reference to FIGS. 7, 8 and/or 9.

On the uplink, at the UE 115-*f*, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the modulator/demodulators 1354-*a* through 1354-*n* (e.g., for SC-FDMA, etc.), and be transmitted to the base station 105-*h* in accordance with the transmission parameters received from the base station 105-*h*. At the base station 105-*h*, the UL signals from the UE 115-*f* may be received by the antennas 1334, processed by the modulator/demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate one or more of a base station HARQ feedback operation module 1015-*c*. The base station HARQ feedback operation module 1015-*c* may be an example of aspects of the base station HARQ feedback operation module 1015 described with reference to FIGS. 10, 11 and/or 12.

The components of the UE 115-*f* may, individually or collectively, be implemented with one or more ASICs adapted to perform some or all of the applicable functions in hardware. Each of the noted modules may be a means for performing one or more functions related to operation of the MIMO communication system 1300. Similarly, the components of the base station 105-*h* may, individually or collectively, be implemented with one or more ASICs adapted to perform some or all of the applicable functions in hardware. Each of the noted components may be a means for performing one or more functions related to operation of the MIMO communication system 1300.

Figure 14:
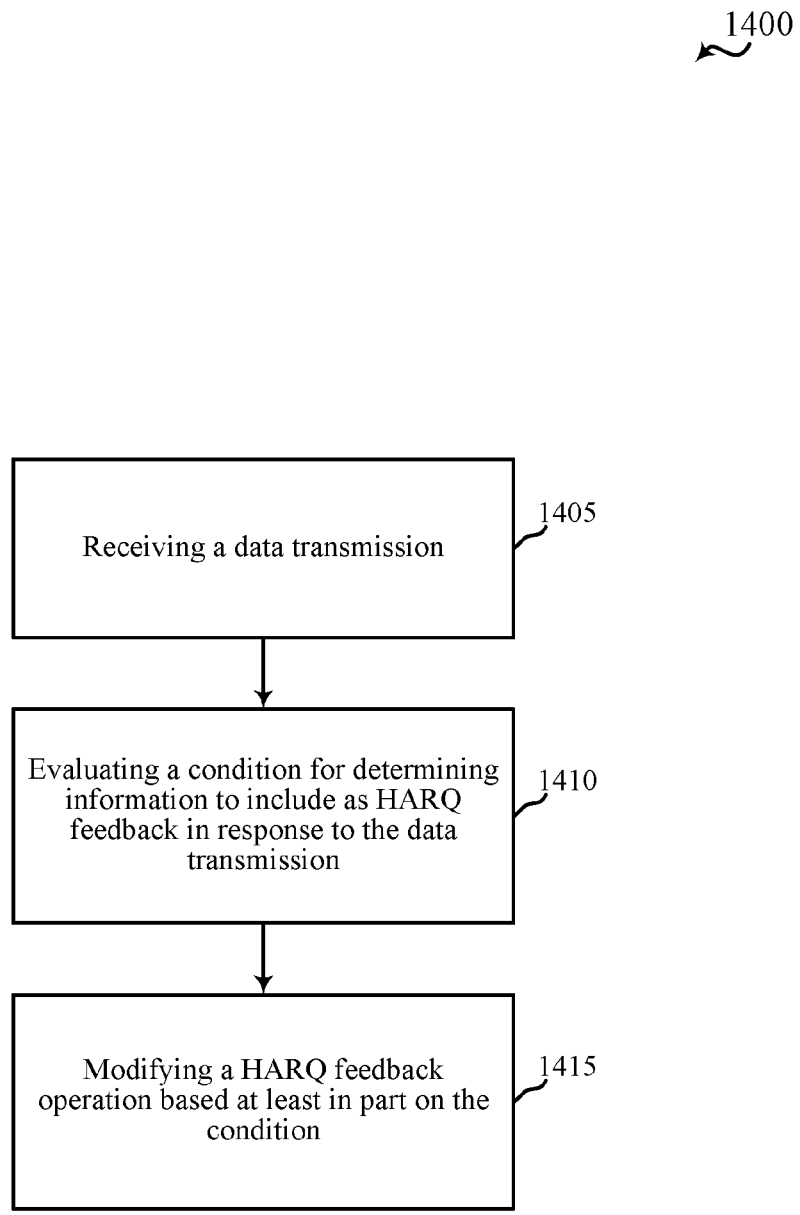
FIGS. 14-19 illustrate methods for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1-6, 9, and 13, and/or aspects of one or more of the devices 705 described with reference to FIGS. 7 and 8. Additionally, the method 1400 may be used with reference to aspects of one or more base stations 105 when these base stations transmit HARQ feedback to a UE, for example. In some examples, a UE or base station may execute one or more sets of codes to control the functional elements of the UE or base station to perform the functions described below. Additionally or alternatively, the UE or base station may perform one or more of the functions described below using special-purpose hardware.

At block 1405, the method 1400 may include receiving a data transmission. The data transmission may be from a base station or some other sending device, for example. The operations at block 1405 may be performed using the UE receiver module 710 described with reference to FIG. 7 or 8.

At block 1410, the method 1400 may include evaluating a condition for determining information to include as HARQ feedback in response to the data transmission. The condition to be evaluated may have been sent from the sending device, and may include an indication that HARQ feedback operations are to be modified. Alternatively, the condition to be evaluated may include channel or traffic conditions. The operations at block 1410 may be performed using the HARQ feedback operation modification determination module 805 described with reference to FIG. 8.

At block 1415, the method 1400 may include modifying a HARQ feedback operation based at least in part on the condition. HARQ feedback operation modifications may include turning off HARQ feedback altogether. HARQ feedback operation modifications may also include simplifying HARQ feedback from a three-state feedback to a two-state feedback. TTI length for HARQ feedback may also be modified (e.g., extended) so as to improve HARQ feedback reliability. The operations at block 1415 may be performed using the HARQ feedback turn off module 810 or the HARQ feedback operation modification module 815 described with reference to FIG. 8.

Thus, the method 1400 may provide for wireless communication. It should be noted that the method 1400 is just one implementation and that the operations of the method 1400 may be rearranged or otherwise modified such that other implementations are possible.

Figure 15:
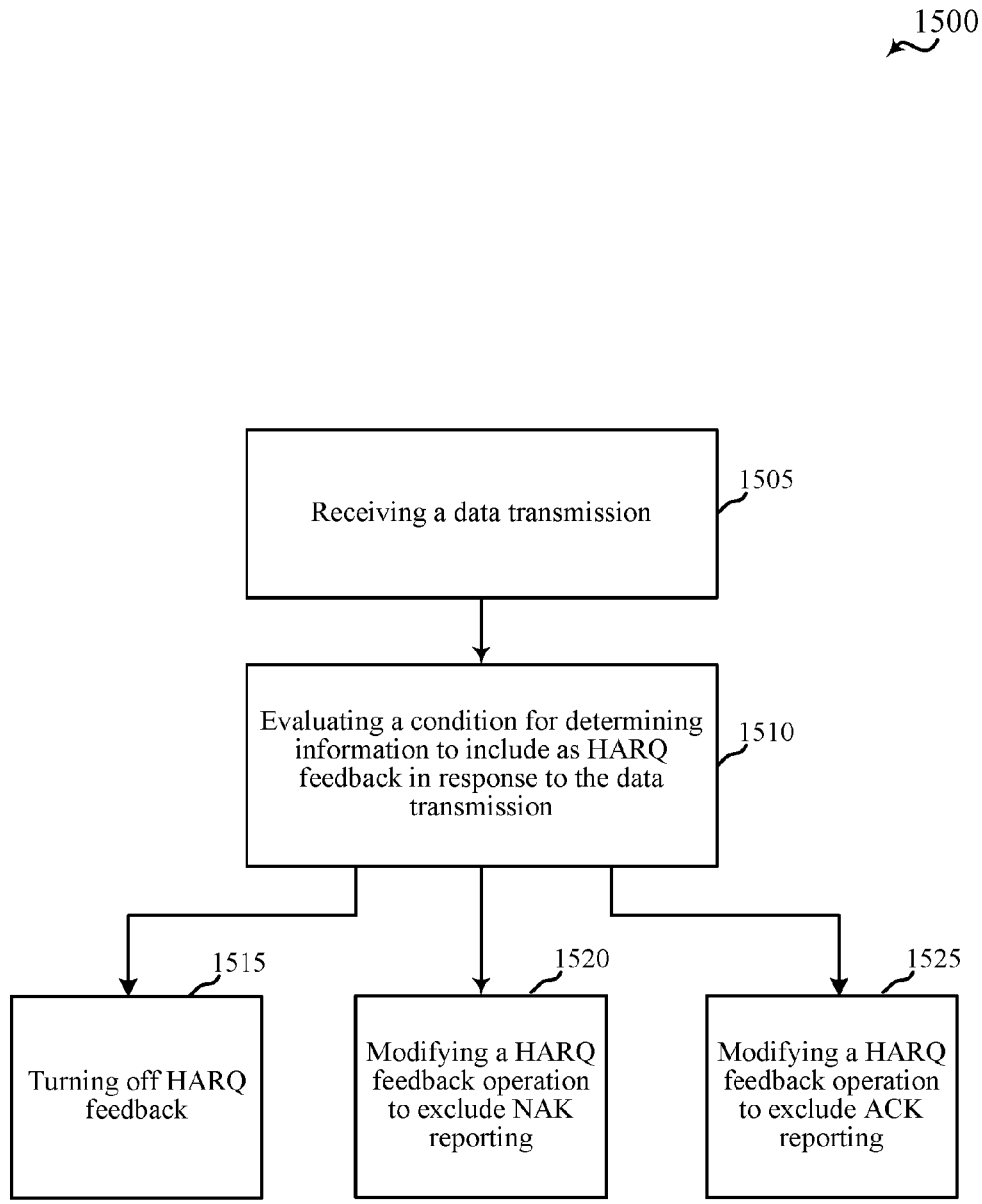

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1-6, 9, and 13, and/or aspects of one or more of the devices 705 described with reference to FIGS. 7 and 8. Additionally, the method 1500 may be used with reference to aspects of one or more base stations 105 when these base stations transmit HARQ feedback to a UE, for example. In some examples, a UE or base station may execute one or more sets of codes to control the functional elements of the UE or base station to perform the functions described below. Additionally or alternatively, the UE or base station may perform one or more of the functions described below using special-purpose hardware.

At block 1505, the method 1500 may include receiving a data transmission. The data transmission may be from a base station or some other sending device, for example. The operations at block 1505 may be performed using the UE receiver module 710 described with reference to FIG. 7 or 8.

At block 1510, the method 1500 may include evaluating a condition for determining information to include as HARQ feedback in response to the data transmission. The condition to be evaluated may have been sent from the sending device, and may include an indication that HARQ feedback operations are to be modified. Alternatively, the condition to be evaluated may include channel or traffic conditions. The operations at block 1510 may be performed using the HARQ feedback operation modification determination module 805 described with reference to FIG. 8.

Based on the condition evaluated, HARQ feedback operations may be modified in a number of different ways. Some of these are illustrated in blocks 1515, 1520, and 1525.

At block 1515, the method 1500 may include turning off HARQ feedback. The operations at block 1415 may be performed using the HARQ feedback turn off module 810 described with reference to FIG. 8. At block 1520, the method 1500 may include modifying a HARQ feedback operation to exclude NAK reporting. The exclusion of NAK reporting may be in accordance with a two-state HARQ feedback reporting or may represent an occasional skipping of NAK reporting in normal three-state HARQ feedback reporting. The operations at block 1520 may be performed using the HARQ feedback operation modification module 815 described with reference to FIG. 8.

At block 1525, the method 1500 may include modifying a HARQ feedback operation to exclude ACK reporting. The exclusion of ACK reporting may be in accordance with a two-state HARQ feedback reporting or may represent an occasional skipping of ACK reporting in normal three-state HARQ feedback reporting. The operations at block 1525 may be performed using the HARQ feedback operation modification module 815 described with reference to FIG. 8.

Thus, the method 1500 may provide for wireless communication. It should be noted that the method 1500 is just one implementation and that the operations of the method 1500 may be rearranged or otherwise modified such that other implementations are possible.

Figure 16:
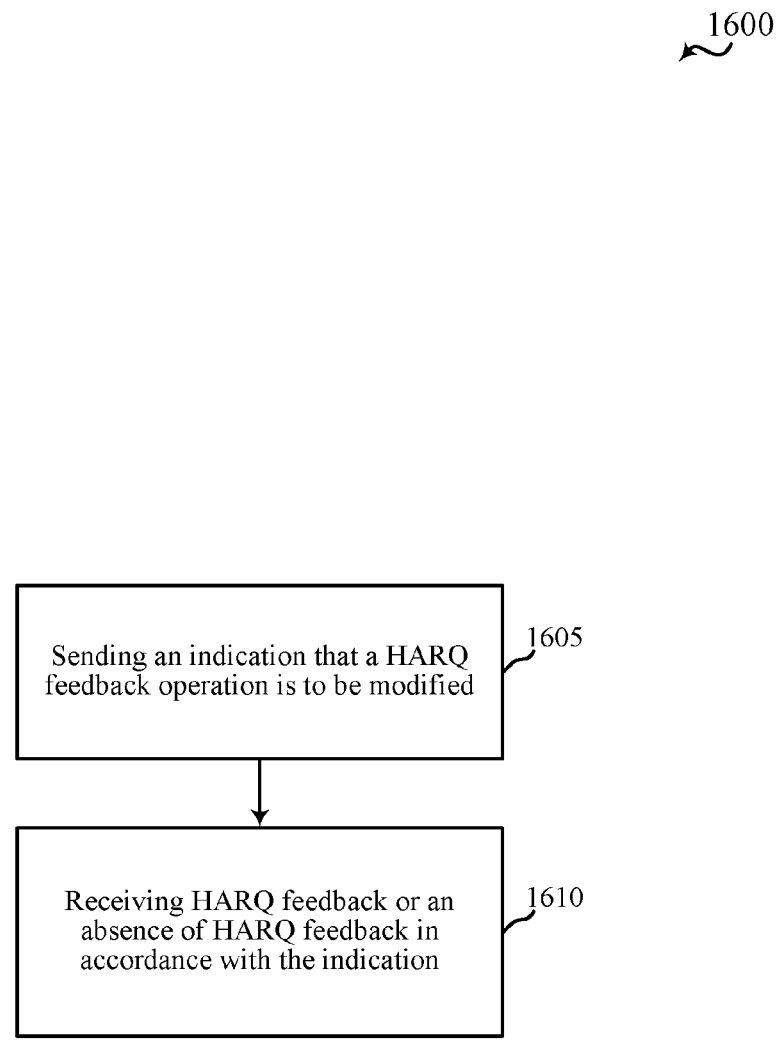

FIG. 16 is a flow chart illustrating an example of a method 1600 for wireless communication, in accordance with various aspects of the present disclosure. For clarity, the method 1600 is described below with reference to aspects of one or more of the base stations 105 described with reference to FIGS. 1-6, 12, and 13, and/or aspects of one or more of the apparatuses 1005 described with reference to FIGS. 10 and 11. Additionally, the method 1600 may be used with reference to aspects of one or more UEs 115 when these UEs receive HARQ feedback from a base station, for example. In some examples, a base station or UE may execute one or more sets of codes to control the functional elements of the base station or UE to perform the functions described below. Additionally or alternatively, the base station or UE may perform one or more of the functions described below using special-purpose hardware.

At block 1605, the method 1600 may include sending an indication that a HARQ feedback operation is to be modified. The indication may include a device-specific configuration or may include an indicator in a control channel, for example. The indication may be explicit or implicit. An example of an implicit indicator includes the use of specific MCS indices to indicate to a receiving device that HARQ feedback operations are to be modified. The operations at block 1605 may be performed using the HARQ feedback operation modification determination module 1105 or the HARQ feedback operation modification transmit module 1110 described with reference to FIG. 11.

At block 1610, the method 1600 may include receiving HARQ feedback or an absence of HARQ feedback in accordance with the indication. The received HARQ feedback may exclude an ACK or NAK reporting, for example. The operations at block 1610 may be performed using the HARQ feedback receipt module 1115 described with reference to FIG. 11.

Thus, the method 1600 may provide for wireless communication. It should be noted that the method 1600 is just one implementation and that the operations of the method 1600 may be rearranged or otherwise modified such that other implementations are possible.

Figure 17:
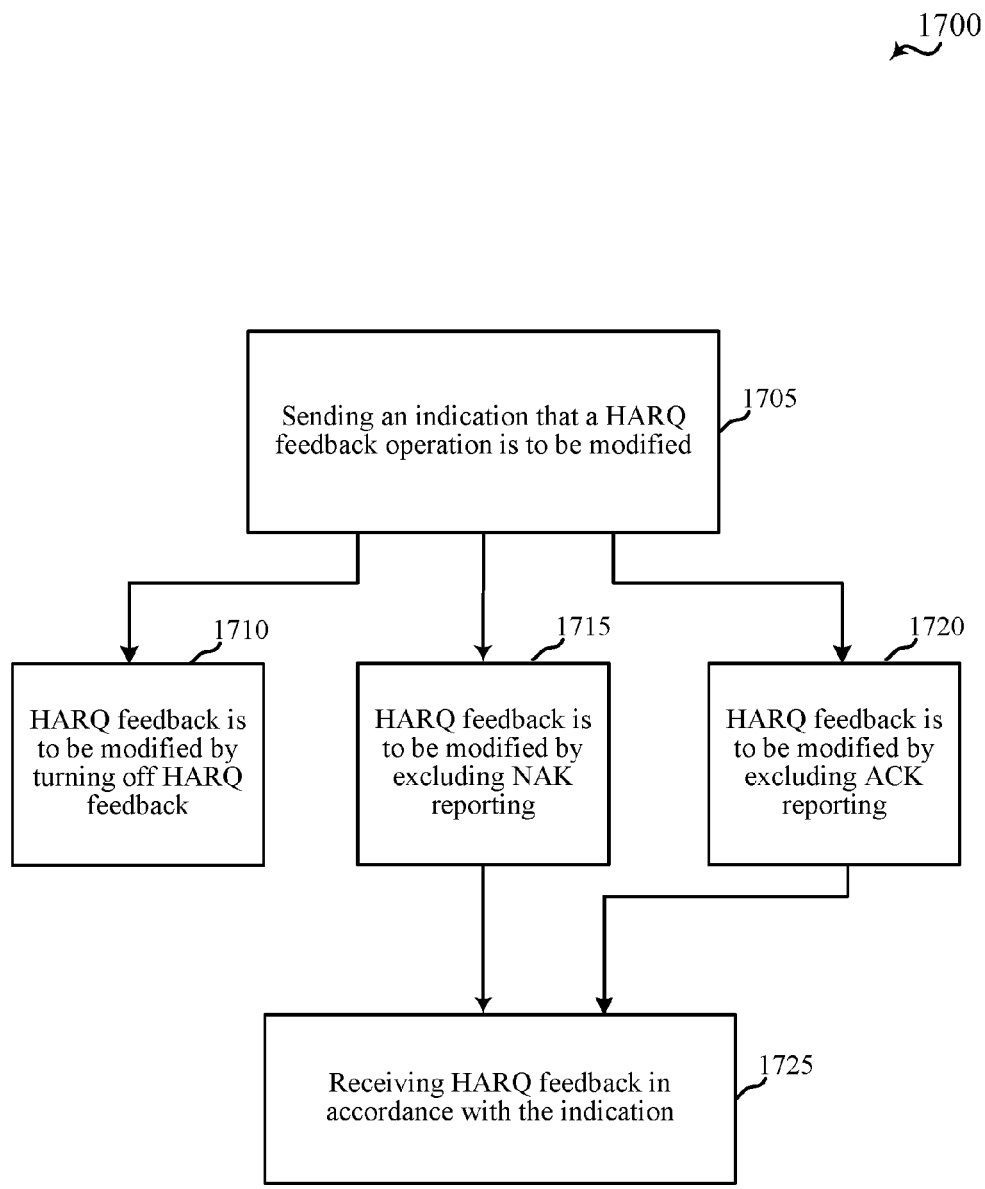

FIG. 17 is a flow chart illustrating an example of a method 1700 for wireless communication, in accordance with various aspects of the present disclosure. For clarity, the method 1700 is described below with reference to aspects of one or more of the base stations 105 described with reference to FIGS. 1-6, 12, and 13, and/or aspects of one or more of the apparatuses 1005 described with reference to FIGS. 10 and 11. Additionally, the method 1700 may be used with reference to aspects of one or more UEs 115 when these UEs receive HARQ feedback from a base station, for example. In some examples, a base station or UE may execute one or more sets of codes to control the functional elements of the base station or UE to perform the functions described below.

Additionally or alternatively, the base station or UE may perform one or more of the functions described below using special-purpose hardware.

At block 1705, the method 1700 may include sending an indication that a HARQ feedback operation is to be modified. The indication may include a device-specific configuration or may include an indicator in a control channel, for example. The indication may be explicit or implicit. An example of an implicit indicator includes the use of specific MCS indices to indicate to a receiving device that HARQ feedback operations are to be modified. The operations at block 1705 may be performed using the HARQ feedback operation modification determination module 1105 or the HARQ feedback operation modification transmit module 1110 described with reference to FIG. 11.

The indication sent at block 1705 may indicate different types of HARQ feedback operation modifications, some of which are illustrated at blocks 1710, 1715, and 1720.

At block 1710, the indication indicates that HARQ feedback is to be modified by turning off HARQ feedback. In this case, the indication may be a semi-static indication (such as an updated configuration) or a dynamic indication (such as an indicator in a control channel). The indication may be explicit or implicit, as described above. The operations at block 1710 may be performed using the HARQ feedback operation modification determination module 1105 or the HARQ feedback operation modification transmit module 1110 described with reference to FIG. 11.

At block 1715, the indication indicates that HARQ feedback is to be modified by excluding NAK reporting. In this case, the indication may be a dynamic indication (such as an indicator in a control channel). The indication may be explicit or implicit, as described above. The operations at block 1715 may be performed using the HARQ feedback operation modification determination module 1105 or the HARQ feedback operation modification transmit module 1110 described with reference to FIG. 11.

At block 1720, the indication indicates that HARQ feedback is to be modified by excluding ACK reporting. In this case, the indication may be a dynamic indication (such as an indicator in a control channel). The indication may be explicit or implicit, as described above. The operations at block 1720 may be performed using the HARQ feedback operation modification determination module 1105 or the HARQ feedback operation modification transmit module 1110 described with reference to FIG. 11.

If the indicator indicates that HARQ feedback is to occur but is to be modified, such as through exclusion of either NAK or ACK reporting (as in blocks 1715, 1720), then method 1700 may further include block 1725. At block 1725, the method 1700 may include receiving HARQ feedback in accordance with the indication. The operations at block 1725 may be performed using the HARQ feedback receipt module 1115 described with reference to FIG. 11.

Thus, the method 1700 may provide for wireless communication. It should be noted that the method 1700 is just one implementation and that the operations of the method 1700 may be rearranged or otherwise modified such that other implementations are possible.

Figure 18:
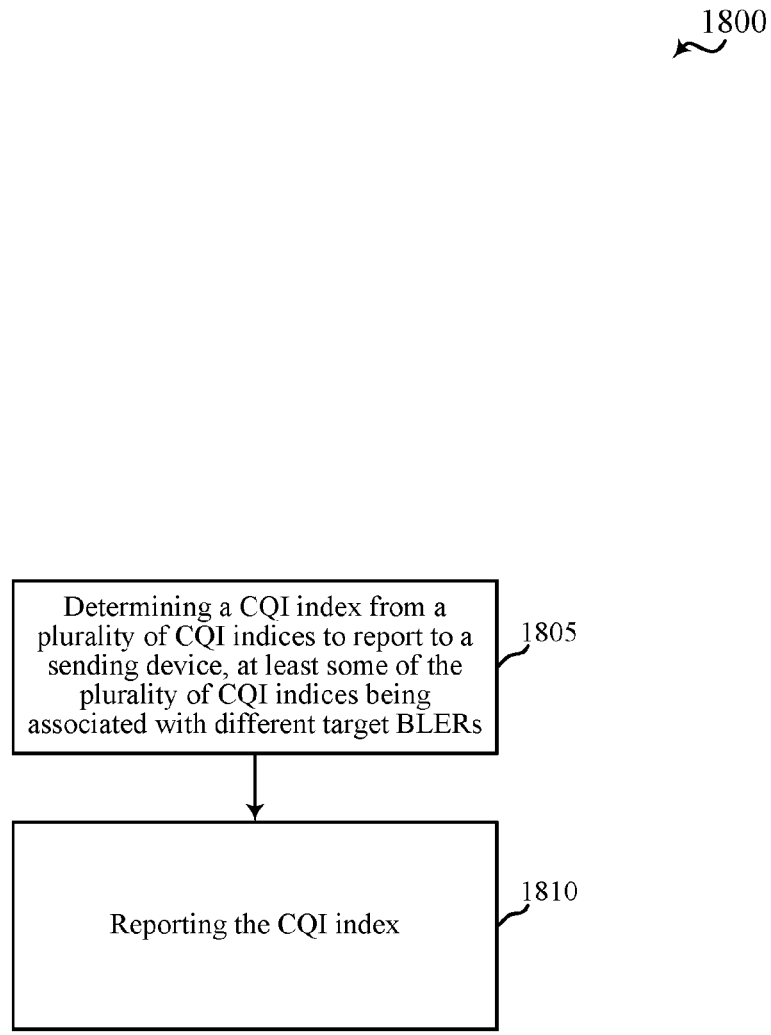

FIG. 18 is a flow chart illustrating an example of a method 1800 for wireless communication, in accordance with various aspects of the present disclosure. For clarity, the method 1800 is described below with reference to aspects of one or more of the UEs 115 described with reference to FIGS. 1-6, 9, and 13, and/or aspects of one or more of the devices 705 described with reference to FIGS. 7 and 8. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include determining a CQI index from a plurality of CQI indices to report to a sending device, at least some of the plurality of CQI indices being associated with different target BLERs. In some aspects, this may further include associating different BLERs with the at least some of the plurality of CQI indices based at least in part on a determination of whether to provide HARQ feedback in response to a data transmission for which the CQI index relates. The operations at block 1805 may be performed using the CQI transmit module 925 described with reference to FIG. 9.

At block 1810, the method 1800 may include reporting the CQI index. The operations at block 1810 may be performed using the CQI transmit module 925 in combination with the UE transceiver module 935 described with reference to FIG. 9.

Thus, the method 1800 may provide for wireless communication. It should be noted that the method 1800 is just one implementation and that the operations of the method 1800 may be rearranged or otherwise modified such that other implementations are possible.

Figure 19:
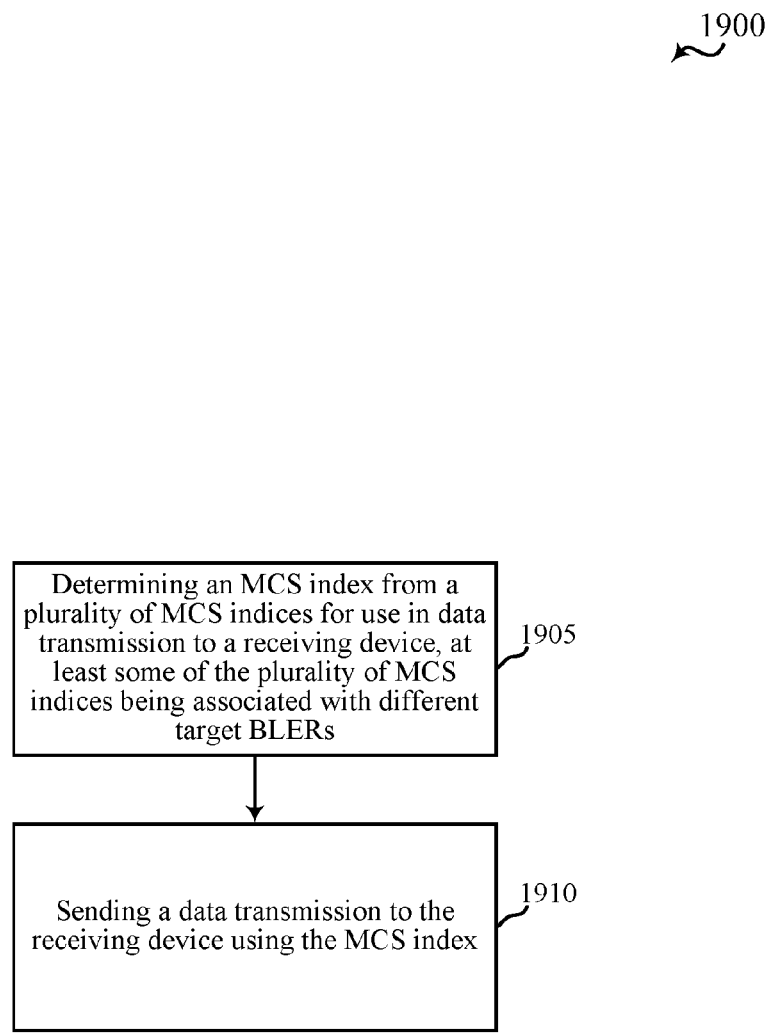

FIG. 19 is a flow chart illustrating an example of a method 1900 for wireless communication, in accordance with various aspects of the present disclosure. For clarity, the method 1900 is described below with reference to aspects of one or more of the base stations 105 described with reference to FIGS. 1-6, 12, and 13, and/or aspects of one or more of the apparatuses 1005 described with reference to FIGS. 10 and 11. In some examples, a base station may execute one or more sets of codes to control the functional elements of the base station to perform the functions described below. Additionally or alternatively, the base station may perform one or more of the functions described below using special-purpose hardware.

At block 1905, the method 1900 may include determining an MCS index from a plurality of MCS indices for use in data transmission to a receiving device, at least some of the plurality of MCS indices being associated with different target BLERs. In some instances, this may also include associating different BLERs with the at least some of the plurality of MCS indices based at least in part on whether the receiving device is reporting HARQ feedback. The operations at block 1905 may be performed using the MCS application module 1215 described with reference to FIG. 12.

At block 1910, the method 1900 may include sending a data transmission to the receiving device using the MCS index. The operations at block 1910 may be performed using a combination of the MCS application module 1215 and the base station transceiver module(s) 1250 described with reference to FIG. 12.

Thus, the method 1900 may provide for wireless communication. It should be noted that the method 1900 is just one implementation and that the operations of the method 1900 may be rearranged or otherwise modified such that other implementations are possible.

In some examples, aspects from two or more of the methods 1400-1900 may be combined. It should be noted that the methods 1400-1900 are just example implementations, and that the operations of the methods 1400-1900 may be rearranged or otherwise modified such that other implementations are possible.

Additionally, while the above methods and descriptions have primarily focused on HARQ feedback being sent from a UE to a base station, the methods and descriptions may similarly apply to HARQ feedback being sent from a base station to a UE. In general, the methods and descriptions above may apply to HARQ feedback being sent from a receiving device (a device that has received a data transmission) to a sending device (a device that sent the data transmission). Modifications to HARQ feedback operations may be applied to both DL HARQ and UL HARQ, or to just one of DL HARQ and UL HARQ.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a receiving device, comprising:
   receiving a data transmission for communications having a latency requirement less than a threshold;
   determining a reduced transmission time interval (TTI) for feedback signaling based at least in part on the received data transmission;
   evaluating a condition for determining information to include as hybrid automatic repeat request (HARQ) feedback in response to the data transmission, wherein evaluating the condition includes receiving a modulation and coding scheme (MCS) index, and determining that the MCS index is below an MCS index threshold; and
   modifying a HARQ feedback operation based at least in part on determining the reduced TTI and determining that the MCS index is below the MCS index threshold.

2. The method of claim 1, further comprising:
   receiving a device configuration indicating that HARQ feedback is to be turned off, wherein the device configuration is the condition to be evaluated.

3. The method of claim 1, further comprising:
   receiving an indication in a control channel that HARQ feedback for the data transmission is to be turned off, wherein the indication is the condition to be evaluated.

4. The method of claim 1, wherein evaluating the condition for determining information to include as HARQ feedback comprises:
   determining that the receiving device is power-limited and that, based at least in part on the determining, HARQ feedback is to be turned off.

5. The method of claim 1, wherein modifying the HARQ feedback operation based at least in part on the condition comprises:
   modifying the HARQ feedback operation to exclude negative acknowledgement (NAK) reporting.

6. The method of claim 5, wherein modifying the HARQ feedback operation to exclude NAK reporting comprises one or both of excluding NAK reporting based at least in part on an indication received in a control channel or excluding NAK reporting based at least in part on a determination that a received power of a reference signal at the receiving device is below a predetermined threshold.

7. The method of claim 1, wherein modifying the HARQ feedback operation based at least in part on the condition comprises:
   modifying the HARQ feedback operation to exclude acknowledgment (ACK) reporting.

8. The method of claim 7, wherein modifying the HARQ feedback operation to exclude ACK reporting comprises one or both of excluding ACK reporting based at least in part on an indication received in a control channel, excluding ACK reporting based at least in part on a determination that the receiving device is power-limited, or excluding ACK reporting based at least in part on a determination that a received power of a reference signal at the receiving device is above a predetermined threshold.

9. The method of claim 1, wherein evaluating the condition for determining information to include as HARQ feedback comprises:
   determining channel or traffic conditions.

10. The method of claim 1, wherein modifying the HARQ feedback operation based at least in part on the condition comprises:
    using a transmission time interval (TTI) for HARQ feedback that is longer than a TTI used for the data transmission.

11. The method of claim 1, further comprising:
    transmitting to a sending device that sent the data transmission an indication that the HARQ feedback operation has been modified.

12. The method of claim 11, wherein transmitting the indication comprises:
    transmitting the indication periodically or in response to an aperiodic request.

13. The method of claim 11, wherein transmitting the indication comprises:
    including the indication as part of a physical layer payload or as part of a media access control (MAC) layer payload.

14. An apparatus for wireless communication, comprising:
    a processor;
    memory in electronic communication with the processor; and
    instructions stored in the memory, the instructions being executable by the processor to:
    receive a data transmission for communications having a latency requirement less than a threshold;
    determine a reduced transmission time interval (TTI) for feedback signaling based at least in part on the received data transmission;
    evaluate a condition for determining information to include as hybrid automatic repeat request (HARQ) feedback in response to the data transmission, wherein evaluating the condition includes receiving a modulation and coding scheme (MCS) index, and determining that the MCS index is below an MCS index threshold; and
    modify a HARQ feedback operation based at least in part on determining the reduced TTI and determining that the MCS index is below the MCS index threshold.

15. The method of claim 1, wherein modifying the HARQ feedback operation comprises:
    selecting one or more channel quality indicator (CQI) indices from a set of CQI indices, wherein the selected CQI indices correspond to an adjusted block error rate (BLER) based at least in part on the modified HARQ feedback operation; and
    reporting the selected one or more CQI indices to a sending device.

16. The apparatus of claim 14, wherein the instructions are further executable by the processor to cause the apparatus to:
    receive a device configuration indicating that HARQ feedback is to be turned off, wherein the device configuration is the condition to be evaluated.

17. The apparatus of claim 14, wherein the instructions are further executable by the processor to cause the apparatus to:
  receive an indication in a control channel that HARQ feedback for the data transmission is to be turned off, wherein the indication is the condition to be evaluated.

18. The apparatus of claim 14, wherein the instructions for evaluating the condition for determining information to include as HARQ feedback are further executable by the processor to cause the apparatus to:
  determine that the receiving device is power-limited and that, based at least in part on the determining, HARQ feedback is to be turned off.

19. The apparatus of claim 14, wherein the instructions for modifying the HARQ feedback operation based at least in part on the condition are further executable by the processor to cause the apparatus to:
  modify the HARQ feedback operation to exclude negative acknowledgement (NAK) reporting.

20. The apparatus of claim 19, wherein modifying the HARQ feedback operation to exclude NAK reporting comprises one or both of excluding NAK reporting based at least in part on an indication received in a control channel or excluding NAK reporting based at least in part on a determination that a received power of a reference signal at the receiving device is below a predetermined threshold.

21. The apparatus of claim 14, wherein the instructions for modifying the HARQ feedback operation based at least in part on the condition are further executable by the processor to cause the apparatus to:
  modify the HARQ feedback operation to exclude acknowledgment (ACK) reporting.

22. The apparatus of claim 21, wherein modifying the HARQ feedback operation to exclude ACK reporting comprises one or both of excluding ACK reporting based at least in part on an indication received in a control channel, excluding ACK reporting based at least in part on a determination that the receiving device is power-limited, or excluding ACK reporting based at least in part on a determination that a received power of a reference signal at the receiving device is above a predetermined threshold.

23. The apparatus of claim 14, wherein the instructions for evaluating the condition for determining information to include as HARQ feedback are further executable by the processor to cause the apparatus to:
  determine channel or traffic conditions.

24. The apparatus of claim 14, wherein the instructions for modifying the HARQ feedback operation based at least in part on the condition are further executable by the processor to cause the apparatus to:
  using a transmission time interval (TTI) for HARQ feedback that is longer than a TTI used for the data transmission.

25. The apparatus of claim 14, wherein the instructions are further executable by the processor to cause the apparatus to:
  transmit to a sending device that sent the data transmission an indication that the HARQ feedback operation has been modified.

26. The apparatus of claim 25, wherein the instructions for transmitting the indication are further executable by the processor to cause the apparatus to:
  transmit the indication periodically or in response to an aperiodic.

27. The apparatus of claim 25, wherein the instructions for transmitting the indication are further executable by the processor to cause the apparatus to:
  include the indication as part of a physical layer payload or as part of a media access control (MAC) layer payload.

28. The apparatus of claim 14, wherein the instructions for modifying the HARQ feedback are further executable by the processor to cause the apparatus to:
  select one or more channel quality indicator (CQI) indices from a set of CQI indices, wherein the selected CQI indices correspond to an adjusted block error rate (BLER) based at least in part on the modified HARQ feedback operation; and
  report the selected one or more CQI indices to a sending device.

* * * * *